(12) United States Patent
Imai et al.

(10) Patent No.: US 12,377,683 B2
(45) Date of Patent: Aug. 5, 2025

(54) PNEUMATIC TIRE

(71) Applicant: Sumitomo Rubber Industries, Ltd., Kobe (JP)

(72) Inventors: Daiki Imai, Kobe (JP); Rena Onitsuka, Kobe (JP); Suxiang Yuan, Kobe (JP); Junya Sueno, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 35 days.

(21) Appl. No.: 18/372,229

(22) Filed: Sep. 25, 2023

(65) Prior Publication Data

US 2024/0131865 A1    Apr. 25, 2024
US 2024/0227445 A9    Jul. 11, 2024

(30) Foreign Application Priority Data

Oct. 21, 2022 (JP) .................................. 2022-168894
Oct. 21, 2022 (JP) .................................. 2022-168900

(Continued)

(51) Int. Cl.
*B60C 5/14*        (2006.01)
*B60C 3/04*        (2006.01)
(Continued)

(52) U.S. Cl.
CPC .................. *B60C 5/14* (2013.01); *B60C 3/04* (2013.01); *B60C 11/03* (2013.01); *B60C 2011/0025* (2013.01); *B60C 2011/0341* (2013.01)

(58) Field of Classification Search
CPC ..... B60C 5/14; B60C 5/142; B60C 2005/145; B60C 2005/147; B60C 2009/145;
(Continued)

(56) References Cited

U.S. PATENT DOCUMENTS 5,355,922 A * 10/1994 Kogure ..................... B60C 9/26
                                                                    152/526
2004/0238094 A1* 12/2004 Kajita ................. B60C 15/0045
                                                                    152/542
(Continued)

FOREIGN PATENT DOCUMENTS

DE        102013103077 A1 * 10/2014 ........... B60C 1/0008
DE        10 2013 106 015 A1    12/2014
(Continued)

OTHER PUBLICATIONS

Baron John, "How Do I Calculate the Volume of A Tyre?", Dec. 26, 2018, Quora, https://www.quora.com/How-do-I-calculate-the-volume-of-a-tyre (Year: 2018).*

(Continued)

*Primary Examiner* — Blaine Copenheaver
*Assistant Examiner* — Thomas Frank Schneider
(74) *Attorney, Agent, or Firm* — Birch, Stewart, Kolasch & Birch, LLP

(57) ABSTRACT

A pneumatic tire includes a tread portion, a pair of sidewall portions, a pair of bead portions, a carcass extending between the pair of bead portions, and an inner rubber extending between the pair of bead portions on an inner side of the carcass. The inner rubber includes a first portion extending in the tread portion with a first thickness and a second portion extending in each of or one of the pair of sidewall portions with a second thickness. The first thickness is greater than the second thickness. In a tire meridian cross-section, a cross-sectional area of the inner rubber is in a range from 1.5% to 10% of an inner-cavity cross-sectional area of the pneumatic tire.

19 Claims, 11 Drawing Sheets

(30) Foreign Application Priority Data

Oct. 21, 2022 (JP) ................................ 2022-169354
Oct. 21, 2022 (JP) ................................ 2022-169355

(51) Int. Cl.
B60C 11/00 (2006.01)
B60C 11/03 (2006.01)

(58) Field of Classification Search
CPC ......... B60C 11/0008; B60C 2011/0016; B60C 2011/0025; B60C 2011/0033
See application file for complete search history.

(56) References Cited

U.S. PATENT DOCUMENTS

| | | | |
|---|---|---|---|
| 2005/0269004 A1* | 12/2005 | Miyabe | B60C 11/0304 152/209.24 |
| 2011/0146869 A1* | 6/2011 | Majumdar | B29C 73/22 152/503 |
| 2016/0024280 A1* | 1/2016 | Wang | C08C 19/42 524/399 |
| 2016/0046155 A1* | 2/2016 | Nakajima | B60C 9/09 152/554 |
| 2016/0159148 A1* | 6/2016 | Taniguchi | B60C 9/04 152/454 |
| 2016/0303913 A1* | 10/2016 | Caffeau | B60C 9/08 |
| 2017/0028788 A1* | 2/2017 | Kuwayama | B60C 19/002 |
| 2019/0039420 A1* | 2/2019 | Akashi | B60C 11/1218 |
| 2019/0276647 A1* | 9/2019 | Kawashima | C08L 21/00 |

FOREIGN PATENT DOCUMENTS

| | | | |
|---|---|---|---|
| EP | 2 554 617 A2 | | 2/2013 |
| EP | 2 554 617 A3 | | 2/2013 |
| EP | 2 562 009 A2 | | 2/2013 |
| EP | 2 738 017 A1 | | 6/2014 |
| EP | 2 562 009 A3 | | 10/2014 |
| EP | 2 927 027 A1 | | 10/2015 |
| JP | 7-24928 A | | 1/1995 |
| JP | 2005-145429 A | | 6/2005 |
| JP | 2007045274 A | * | 2/2007 |
| JP | 2011088593 A | * | 5/2011 |
| JP | 2017-170968 A | | 9/2017 |
| JP | 2022-96037 A | | 6/2022 |
| WO | WO 98/38049 A1 | | 9/1998 |

OTHER PUBLICATIONS

Extended European Search Report for European Application No. 23197834.7, dated Mar. 7, 2024.

* cited by examiner

PNEUMATIC TIRE

RELATED APPLICATIONS

This application claims the benefit of foreign priority to Japanese Patent Applications No. JP2022-169355, No. JP2022-169354, No. JP2022-168894, and No. JP2022-168900, filed Oct. 21, 2022, which are incorporated by reference in its entirety.

TECHNICAL FIELD

The present disclosure relates to a pneumatic tire.

BACKGROUND OF THE DISCLOSURE

Patent document 1 below discloses a pneumatic tire including a tread portion, a carcass, a belt layer, a band layer, and a cushion rubber. In the pneumatic tire, the shape of the belt plies of the belt layer is specified for the purpose of reducing tire noise.

PATENT DOCUMENTS

[PATENT DOCUMENT 1] Japanese Unexamined Patent Application Publication No. 2005-145429

SUMMARY OF THE DISCLOSURE

In recent years, it has been required to improve the noise performance for environmental considerations. For example, it is known to increase the rubber thickness of the tread portion as a method to improve the noise performance. However, simply increasing the rubber thickness of the tread portion has a problem that the increase in rubber volume reduces the rolling resistance performance and high-speed durability performance.

The present disclosure has been made in view of the above circumstances and has a main object to provide a pneumatic tire capable of improving noise performance while maintaining rolling resistance performance and high-speed durability performance.

In one aspect of the present disclosure, a pneumatic tire includes a tread portion, a pair of sidewall portions, a pair of bead portions, a carcass extending between the pair of bead portions, and an inner rubber extending between the pair of bead portions on an inner side of the carcass. The inner rubber includes a first portion extending in the tread portion with a first thickness and a second portion extending in each of the pair of sidewall portions with a second thickness. The first thickness is greater than the second thickness. In a tire meridian cross-section, a cross-sectional area of the inner rubber is in a range from 1.5% to 10% of an inner-cavity cross-sectional area of the pneumatic tire.

DETAILED DESCRIPTION OF THE DISCLOSURE

One or more embodiments of the present disclosure will be described below in conjunction with the accompanying drawings.

The drawings may contain exaggerations and expressions that differ from the actual dimensional proportions of the structures in order to facilitate understanding of the disclosure. Throughout the specification, the same or common elements are denoted by the same reference signs, and duplicate explanations are omitted.

Figure 1:
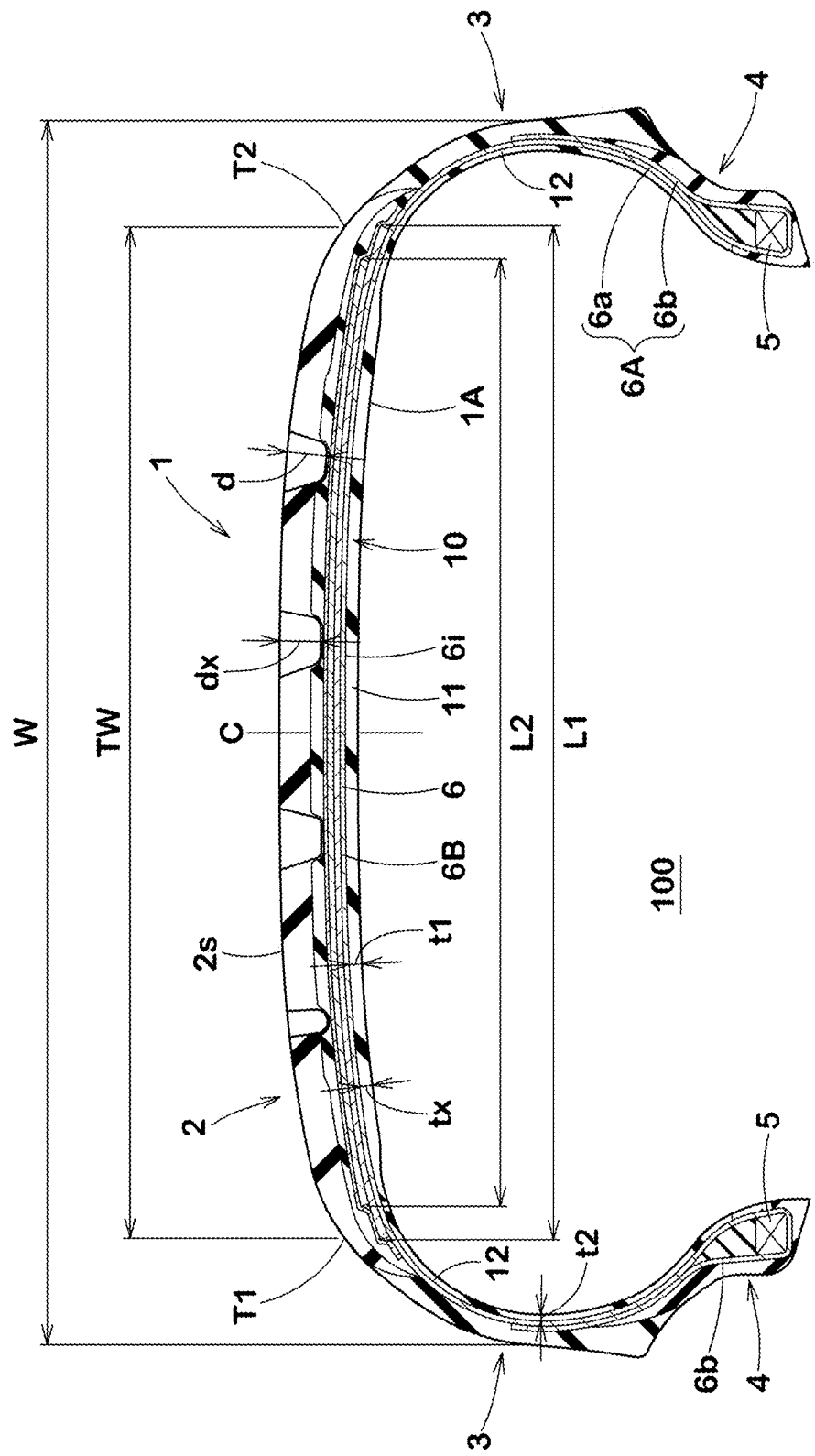
FIG. 1 is a tire meridional cross-sectional view of a pneumatic tire showing an embodiment of the present disclosure.

FIG. 1 shows a cross-sectional view of a tire 1 showing an embodiment of the present disclosure (hereinafter sometimes simply referred to as the "tire 1"). FIG. 1 is a transverse cross-sectional view of the tire 1 under its normal state, including the rotational axis of the tire. The tire 1 according to the present embodiment is, for example, suitably used as a pneumatic tire for passenger cars. The present disclosure is however, not limited to such embodiment, and may be applied to heavy duty pneumatic tires, for example.

In the case of pneumatic tires for which various standards are specified, the normal state means a state of the tire which is mounted on a standard wheel rim, inflated to a standard internal pressure, and loaded with no tire load. In the case of tires for which various standards are not yet established, the normal state means a standard usage state of the tire according to the purpose of use of the tire, in which the tire is not mounted on the vehicle and no load is applied. In this specification, dimensions of each portion of the tire refer to values measured under the normal state unless otherwise noted. In the case of a structure which is difficult to measure under the normal state (for example, an internal structural portion of the tire 1), the dimension is a value measured with the tire 1 placed in a condition as close as possible to the normal state.

The standard wheel rim is a wheel rim specified for the tire in a standard system including standards on which the tire is based, for example, "Standard Rim" in the case of JATMA, "Design Rim" in the case of TRA, and "Measuring Rim" in the case of ETRTO.

The standard internal pressure is air pressure specified for the tire in a standard system including standards on which the tire is based, for example, "Maximum Air Pressure" in the case of JATMA, the maximum value listed in the table "TIRE LOAD LIMITS AT VARIOUS COLD INFLATION PRESSURES" in the case of TRA, and "Inflation Pressure" in the case of ETRTO.

The tire 1 includes a tread portion 2, a pair of sidewall portions 3, a pair of bead portions 4, and a tire cavity 100. Each sidewall portion 3 is connected to a respective one of the outer ends of the tread portion 2 in the tire axial direction and extends in the tire radial direction. Each bead portion 4 is connected to the inner side in the tire radial direction of the respective one of the sidewall portions 3. Further, the tire 1 includes a carcass 6 and an inner rubber 10. The carcass 6 extends between the pair of bead portions 4. In the present embodiment, the carcass 6 extends from one of the bead portions 4 through one of the sidewall portions 3, the tread portion 2, and the other of the sidewall portions 3, to the other of the bead portions 4. The inner rubber 10 is disposed inside the carcass 6 and extends between the pair of bead portions 4 and 4. The inner rubber 10 according to the present embodiment is connected to the chafer rubber in each bead section 4, which is composed of a different type of rubber than the inner rubber 10. In the present embodiment, the inner rubber 10 forms a tire inner cavity surface 1A. In the present embodiment, the inner rubber 10 is made of vulcanized rubber, and is different from a puncture sealant material.

The inner rubber 10 includes a first portion 11 and a second portion 12. The first portion 11 extends in the tread portion 2 with a first thickness t1. The second portion 12 extends in each of or one of the pair of sidewall portions 3 with a second thickness t2. The second portion 12, for example, is arranged on both sides of the first portion 11. The first thickness t1 and the second thickness t2 mean the thickness from the inner surface 6i of the carcass 6 to the tire inner cavity surface 1A.

The first thickness t1 is greater than the second thickness t2. This means that an average value of the first thickness t1 is greater than an average value of the second thickness t2. Here, the average value of the first thickness t1 is a value obtained by dividing the cross-sectional area of the first portion 11 in the tire meridian cross-section by the length of the first portion 11 along the tire inner cavity surface 1A. The average value of the second thickness t2 is a value obtained in the same manner. In the present embodiment, as a preferred aspect, the above-described thickness relationship is maintained over the entire circumference of the tire. However, the present disclosure is not limited to such an aspect.

Figure 2A:
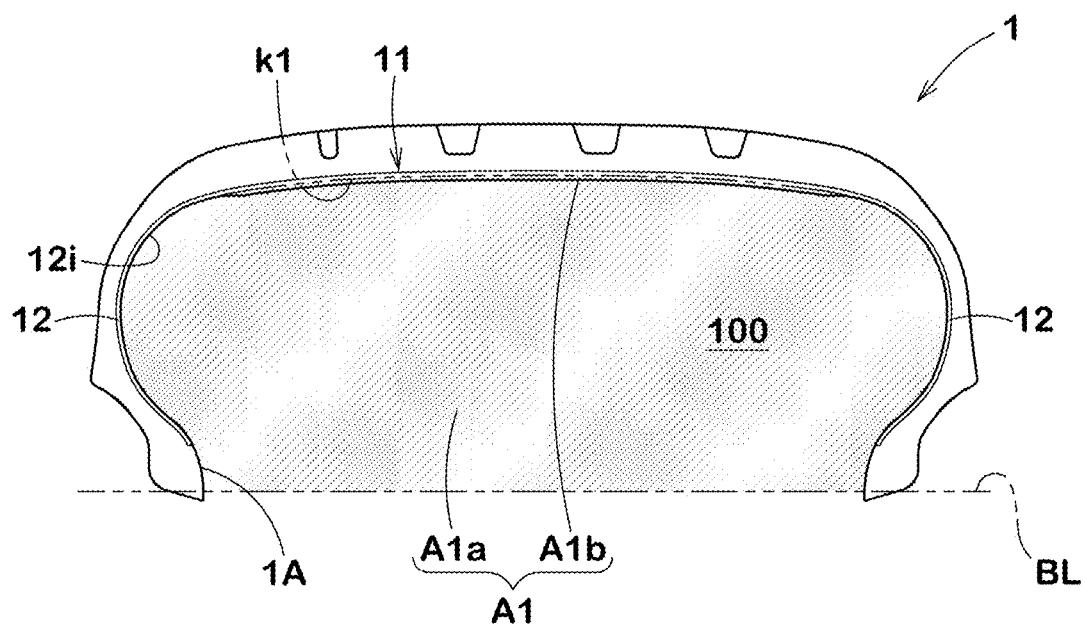
FIG. 2A is a schematic diagram showing an inner-cavity cross-sectional area of the pneumatic tire.
Figure 2B:
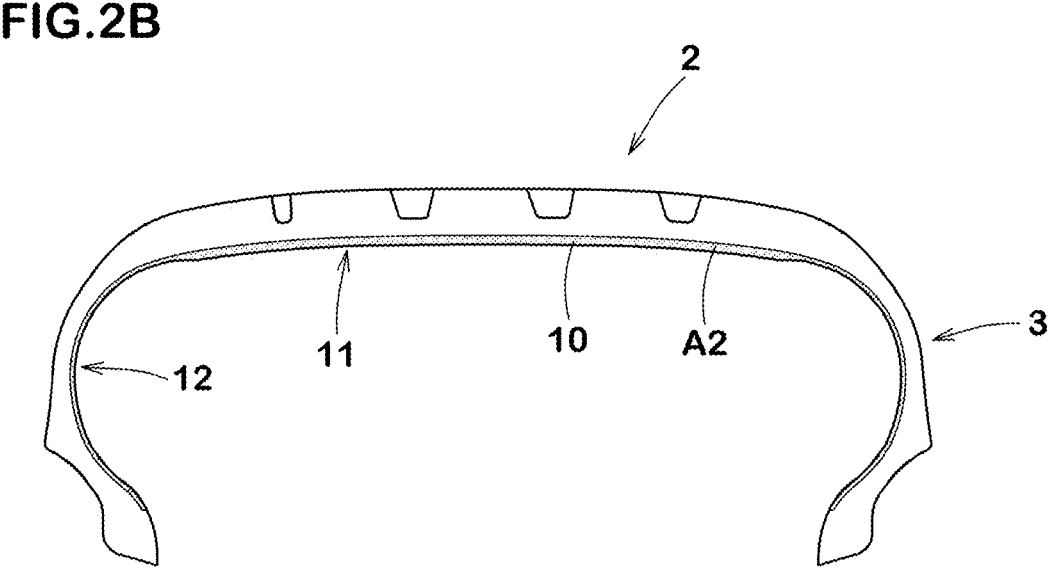
FIG. 2B is a schematic diagram showing the cross-sectional area of an inner rubber.

FIG. 2A is a schematic diagram showing an inner-cavity cross-sectional area A1 of the tire 1 which is colored, and FIG. 2B is a schematic diagram showing the cross-sectional area A2 of the inner rubber 10. As illustrated in FIG. 2A and FIG. 2B, in a tire meridian cross-section, the cross-sectional area A2 of the inner rubber 10 is equal to or more than 1.5% of the inner-cavity cross-sectional area A1 of the tire 1, but preferably equal to or less than 10%. In the present disclosure, by adopting the above configuration, the noise performance can be improved while maintaining the rolling resistance performance and high-speed durability performance. The reasons are as follows.

As shown in FIG. 1, the inner rubber 10 can absorb the driving vibration from the road surface, thus reducing the vehicle interior noise and improving the noise performance. In particular, the first portion 11, which is relatively thicker than the tread portion 2, can effectively absorb the vibration from the tread portion 2. In addition, the inner rubber 10 that forms the tire inner cavity surface 1A can maintain a high rolling resistance performance compared to the case where the rubber disposed radially outwardly of the carcass 6 is made thicker. Further, since the cross-sectional area A2 (shown in FIG. 2B) is greater than 1.5% of the inner-cavity cross-sectional area A1 (shown in FIG. 2A), the resonance of driving vibration from the road surface in the tire inner cavity 100 can be reduced. Furthermore, since the cross-sectional area A2 is equal to or less than 10% of the inner-cavity cross-sectional area A1, excessive increase of the tire mass can be suppressed. In addition, the second portion 12, which is relatively small in thickness, is placed in the sidewall portions 3, which can enhance the effect of preventing excessive increase of the tire mass. As a result, the tire 1 according to the present embodiment can maintains high rolling resistance performance and high-speed durability performance. In order to exert such an action more effectively, the cross-sectional area A2 is preferably equal to or more than 2.0% of the cross-sectional area A1, but preferably equal to or less than 5.0% of the cross-sectional area A1. As shown in FIG. 2A, the cross-sectional area A1 is the sum of the cross-sectional area A1a surrounded by the bead baseline BL and the tire inner cavity surface 1A, and a cross-sectional area A1b of the first portion 11 located radially inwardly from an imaginary line kl extending smoothly axially inward of the tire inner cavity surface 12i of the respective second portions 12. The bead baseline BL is a tire axial line passing through the rim diameter position determined by the standard on which the tire 1 is based. The cross-sectional area A1b is the same as the cross-sectional area of the additional layer 17 described below, shown in FIG. 10 below.

A more detailed configuration of the present embodiment will be described below. Each configuration described below represents a specific aspect of the present embodiment, therefore, the present disclosure can exhibit the above-described effects even if it does not have the configuration described below. Further, even if any one of the configurations described below is applied alone to the tire of the present disclosure having the features described above, it is possible to expect an improvement in performance according to the adopted configuration. Furthermore, when some of the configurations described below are applied in combination, it is possible to expect a combined improvement in performance according to the respective configurations.

As illustrated in FIG. 1, it is preferable that the tire 1 has a cross-sectional width W of not less than 205 mm and not more than 325 mm, an aspect ratio of not less than 25% and not more than 65%, and a rim diameter of not less than 16 inches and not more than 22 inches. The tire 1 of such a size has relatively large cross-sectional width W, low aspect ratio, and large diameter, which tends to increase the vehicle interior noise and rolling resistance, and to reduce the heat dissipation of the tire. By applying the present disclosure to the tire 1, it is possible to further improve the noise performance while maintaining the rolling resistance and high-speed durability performance. In the specification, "cross-sectional width W", "aspect ratio" and "rim diameter" are synonymous with "nominal section width", "nominal aspect ratio" and "nominal rim diameter code" of a tire in JATMA standard. Thus, the above-mentioned "cross-sectional width W" can be obtained from the axial distance between sidewalls 3 and 3 (total width of the tire) including all the patterns and letters on the sides of the tire, excluding the patterns and letters on the sides of the tire.

The cross-sectional width W of the tire 1 shown in FIG. 1 under the normal state is preferably equal to or more than 225 mm. The tire 1 with a large cross-sectional width W has a relatively large tread width TW, which tends to increase the horn effect. However, in the present embodiment, the first portion 11 can suppress the effect of the horn effect on the noise performance, so that the deterioration of the noise performance can be suppressed even if the tire 1 has a cross-sectional width W equal to or more than 225 mm.

Figure 3:
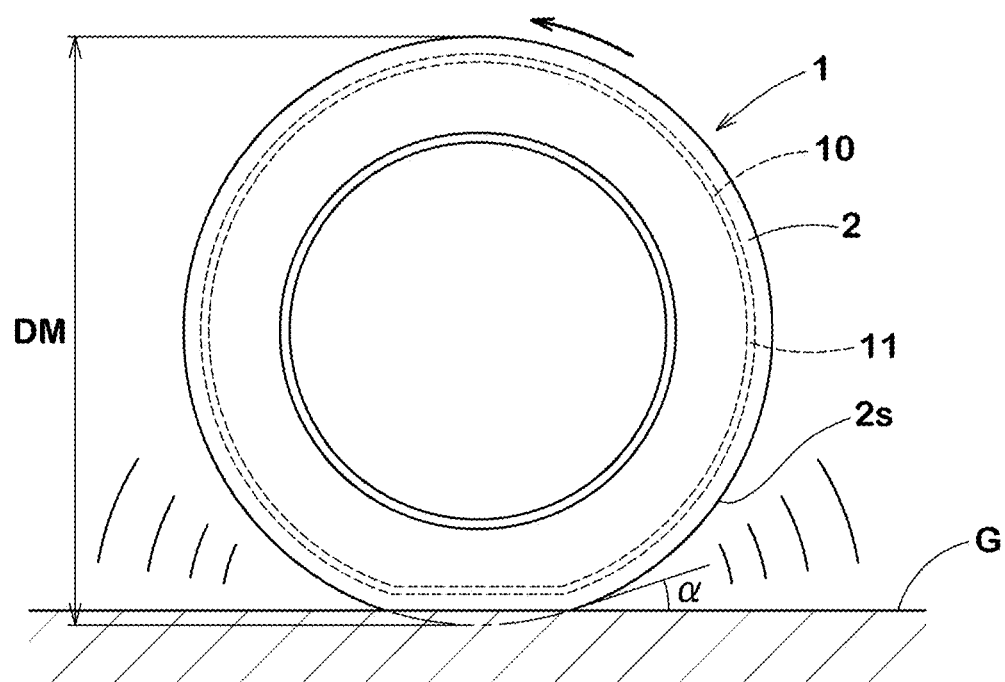
FIG. 3 is a side view showing a running pneumatic tire.

FIG. 3 illustrates how the tire 1 with the first portion 11 on the inner rubber 10 in this embodiment generates noise when driving.

In the present embodiment, the outer diameter DM of the tire 1 in the normal state is equal to or more than 660 mm. For such a tire 1, the angle α between the ground contact surface 2s of the tread portion 2 and the road surface G is small, and the influence of the horn effect on the noise performance of the tire tends to become significant. However, in the tire 1 according to the present embodiment, the influence of the horn effect on the noise performance is suppressed by adopting the above configuration.

As illustrated in FIG. 1, the tire 1 according to the present embodiment has a designated mounting direction on a vehicle. The mounting direction on a vehicle is indicated by letters or symbols, for example, on the outer surface of the sidewalls 3. The tire 1 according to the present disclosure is not limited to such an aspect, but may be used without specifying the mounting direction on a vehicle.

The tread portion 2 includes the tire equator C, a first tread edge T1 (left side in FIG. 1) and a second tread edge T2 (right side in FIG. 1). In the present embodiment, when the tire is mounted on the vehicle, the first tread edge T1 is located on the outside of a vehicle, and the second tread edge T2 is located on the inside of the vehicle. The first tread edge T1 and the second tread edge T2 correspond to the outermost axial contact position of the tire when 70% of the standard tire load is applied to the tire 1 in the normal state and the tread portion 2 is grounded on a flat surface at zero camber angles. The axial distance between the first tread edge T1 and the second tread edge T2 is the tread width TW. The tire equator C is located at the axial distance of 50% of the tread width TW from the first tread edge T1 toward the second tread edge T2. In addition, the outer surface in the tire radial direction of the tread portion 2 between the first tread edge T1 and the second tread edge T2 is the ground contact surface 2s.

In the case of pneumatic tires for which various standards have been established, the standard tire load is a tire load specified for the tire in a standard system including standards on which the tire is based, for example, "Maximum Load Capacity" in the case of JATMA, the maximum value listed in the table "TIRE LOAD LIMITS AT VARIOUS COLD INFLATION PRESSURES" in the case of for TRA, and "Load Capacity" in the case of ETRTO. In the case of tires for which various standards are not yet established, the standard tire load refers to the maximum tire load that can be applied to the tire when using the tire.

The carcass 6 is, for example, composed of a single carcass ply 6A. The carcass ply 6A includes, for example, a main portion 6a and a pair of turn-up portions 6b. The main portion 6a extends, for example, between the pair of bead portions 4. Each turn-up portion 6b is, for example, connected to the main portion 6a and turned up around a respective one of bead cores 5 from the inside to the outside in the tire axial direction.

The carcass ply 6A includes a plurality of carcass cords and a topping rubber covering them (not illustrated). As the carcass cords, organic fiber cords such as aramid and rayon are used. It is preferable that the carcass cords are, for example, arranged at an angle of from 70 to 90 degrees with respect to the tire circumferential direction.

In the tire 1 according to the present embodiment, the twist coefficient K of the carcass cords 6B is set in a range from 2000 to 2500. Here, the twist coefficient K is obtained by multiplying T by the square root of D (K=T√D), where T is the number of twists per 100 mm length, and D is the total fineness (dtex) of the carcass cord 6B. It is noted that the twist coefficient K is a numerical value after the carcass cord 6B is subjected to a dipping treatment.

If a cord with a small twist coefficient K is used as the carcass cords 6B, as the cord fatigue resistance may be deteriorated, the durability of the tire 1 may be affected. In the tire 1 according to the present embodiment, as the carcass cords 6B have a twist coefficient equal to or more than 2000, the cord fatigue resistance can be increased, and the durability performance of the tire 1 can be improved.

On the other hand, if a cord with an excessive large twist coefficient K is used as the carcass cords 6B, good attenuation cannot be obtained from the sidewall portions 3 to the bead portions 4, and the noise performance of the tire 1 may be affected. Further, the deformation of the case structure including the carcass 6 from the sidewall portions 3 to the bead portions 4 is increased, which may result in increased rolling resistance. In the tire 1 according to the present embodiment, as the twist coefficient K of the carcass cords 6B is set to 2500 or less, good attenuation can be obtained from the sidewall portions 3 to the bead portions 4, therefore, noise performance of the tire 1 can be improved, and the vehicle interior noise can be reduced. Moreover, since the deformation of the case structure can be suppressed, the rolling resistance can be reduced.

In the tire 1 according to the present embodiment, of the inner rubber 10, the first portion 11 extending through the tread portion 2 with the first thickness t1 larger than the second thickness t2 of the second portion 12, functions as a mass damper to suppress the vibration of the tread portion 2. Further, the vibrational energy of the tread portion 2 is attenuated by the viscoelastic properties of the rubber arranged in the first portion 11.

Therefore, compared to a conventional pneumatic tire without the first portion 11, the tire 1 according to the present embodiment allows a cord with a large twist coefficient K to be applied as the carcass cord 6B. On the other hand, the increase in rolling resistance which is a concern due to the provision of the first portion 11, can be easily solved by the carcass cords 6B having the twist coefficient K of at most 2500.

That is, the tire 1 according to the present embodiment can reduce the vehicle interior noise without increasing the rolling resistance by the carcass cords 6B whose twist coefficient K is optimized in accordance with the first thickness t1 of the first portion 11.

The tire 1 according to the present embodiment may have a so-called high turn-up structure in which the radially outer end of each turn-up portion 6b of the carcass 6 is positioned outside the maximum width position of the main portion 6a of the carcass 6 in the tire radial direction. Such a carcass 6 makes it difficult for the vibration of the sidewall portion 3 to be transmitted to the bead portions 4, which makes it possible to reduce the vehicle interior noise. Further, since deformation of the case structure can be suppressed from the sidewall portions 3 to the bead portions 4, rolling resistance can be easily reduced. The tire 1 according to the present embodiment may have a so-called ultra-high turn-up structure in which the radially outer end of each turn-up portion 6b of the carcass 6 is positioned inward in the tire axial direction, of the respective outer end in the tire axial direction of the belt layer 7.

For the carcass cords 6B of the present embodiment, polyethylene terephthalate (PET) is used. According to the load index of the tire 1, the number of carcass plies 6A and the fineness of the carcass cords 6B are preferably configured as follows.

[When there is a Single Carcass Ply with PET Cords]

When the fineness of the carcass cord 6B is 1100 dtex/2, the load index is preferably 90 or less.

When the fineness of the carcass cord 6B is 1440 dtex/2, the load index is preferably greater than 90 and less than 100.

When the fineness of the carcass cord 6B is 1670 dtex/2, the load index is preferably greater than 90 and 105 or less.

[When there are Two Carcass Plies with PET Cords]

When the fineness of the carcass cord 6B is 1110 dtex/2, the load index is preferably 110 or less.

When the fineness of the carcass cord 6B is 1440 dtex/2 or 1670 dtex/2, the load index is preferably 115 or less.

Figure 4:
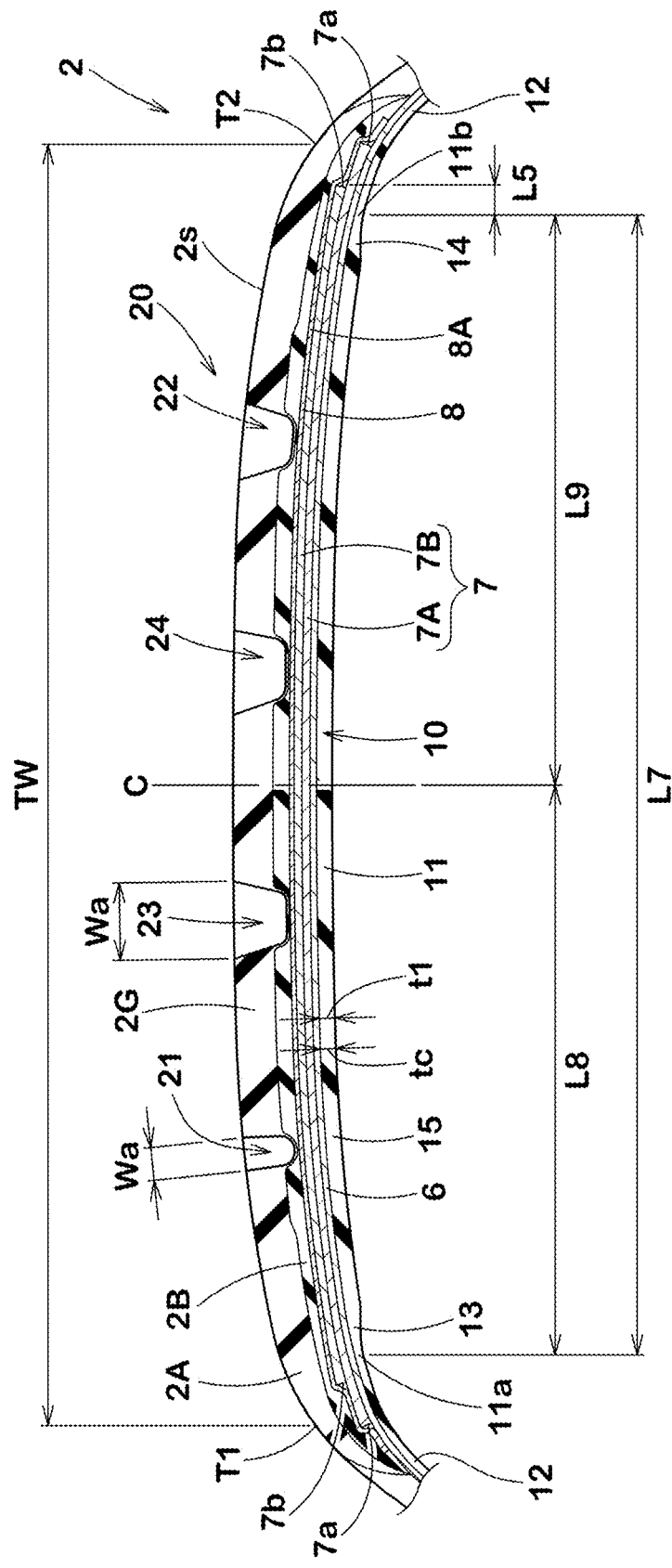
FIG. 4 is an enlarged cross-sectional view of the tread portion of FIG. 1.

FIG. 4 illustrates an enlarged cross-sectional view of the tread portion 2 of FIG. 1. As illustrated in FIG. 4, the tread portion 2 according to the present embodiment includes, for example, a belt layer 7 and a band layer 8 which are arranged outside the carcass 6 in the tire radial direction. The belt layer 7 includes a first belt ply 7A adjacent to the carcass 6 and a second belt ply 7B outside the first belt ply 7A in the tire radial direction. Each of the first belt ply 7A and the second belt ply 7B includes a plurality of belt cords oriented at an angle of from 15 to 45 degrees with respect to the tire circumferential direction, and a topping rubber (not illustrated) covering the belt cords. Note that the tread portion 2 is not limited to such an embodiment.

It is preferable that a length L2 (shown in FIG. 1) in the tire axial direction of the second belt ply 7B is smaller than a length L1 (shown in FIG. 1) in the tire axial direction of the first belt ply 7A. Thereby, the outer ends 7b in the tire axial direction of the second belt ply 7B are located inward in the tire axial direction of the respective axially outer ends 7a of the first belt ply 7A. The length L2 of the second belt ply 7B is preferably in a range from 90% to 98% of the length L1 of the first belt ply 7A. The length L2 of the second belt ply 7B is preferably in a range from 65% to 80% of the cross-sectional width W of the tire 1 in its normal state. This can suppress the vibration of the tread portion 2 while reducing the weight increase of the tire 1.

Figure 5A:
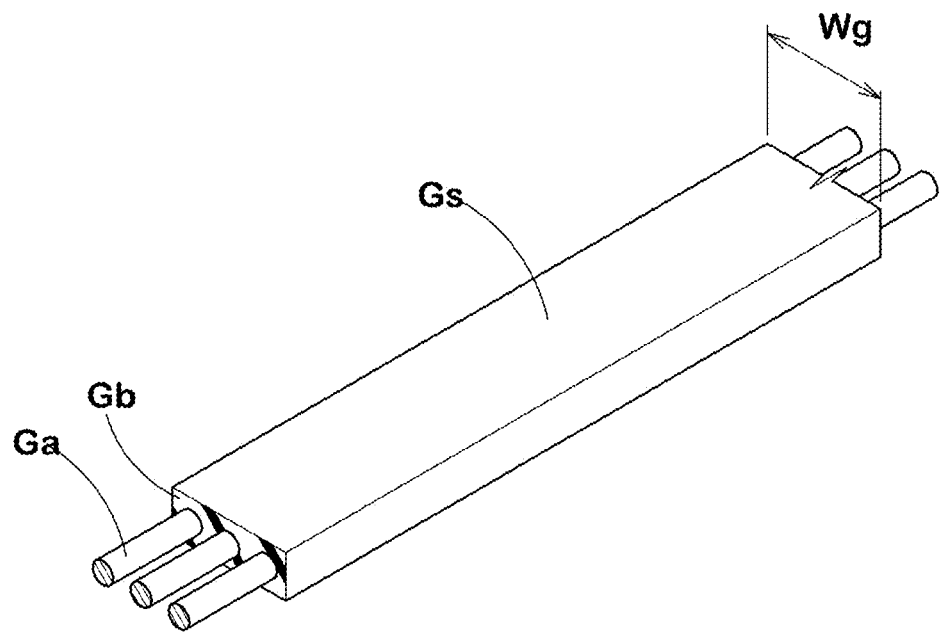
FIG. 5A is a perspective view of a band strip.
Figure 5B:
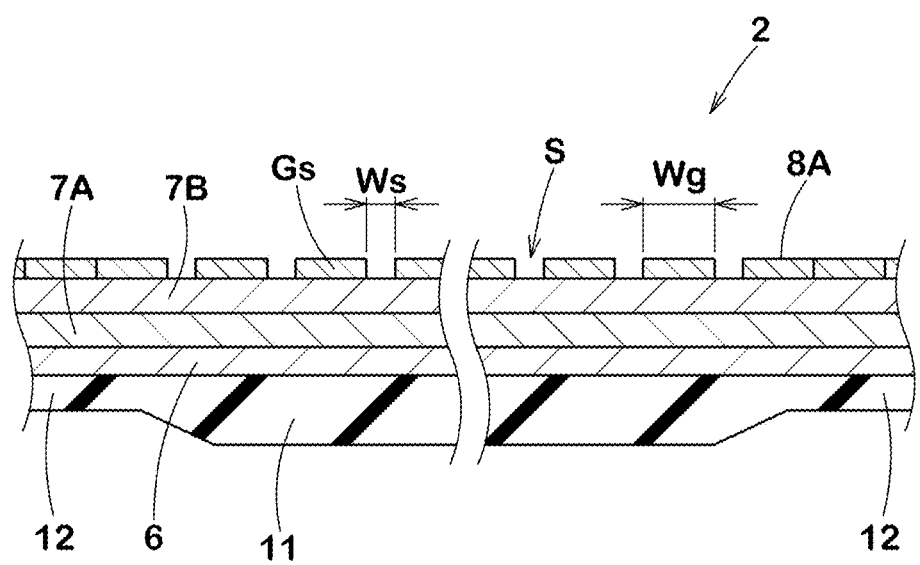
FIG. 5B is a cross-sectional view of the tread portion formed using the band strip.

The band layer 8 according to the present embodiment is arranged to cover the entire belt layer 7. In the present embodiment, the band layer 8 is composed of, for example, a single band ply 8A. The band ply 8A includes, for example, a band cord Ga (shown in FIG. 5A) arranged at an angle of not more than 5 degrees with respect to the tire circumferential direction, and a topping rubber Gb covering the band cord Ga. The band ply 8A may be formed, for example, by spirally winding a band strips Gs (shown in FIG. 5A) containing the band cord Ga. FIG. 5A illustrated a perspective view of the band strip Gs. FIG. 5B illustrates a partial cross-sectional view of the tread portion 2 using the band strip Gs. As illustrated in FIGS. 5A and 5B, the band ply 8A can be provided with a gap S separating the turns of the band strip Gs adjacent to each other in the tire axial direction, for example, in the outer portion of the tire radial direction of the first portion 11. A width Ws of the gap S in the tire axial direction is preferably equal to or more than 20% of the width Wg of the band strip Gs, more preferably equal to or more than 30%, but equal to or less than 60%, more preferably equal to or less than 50%.

Figure 6:
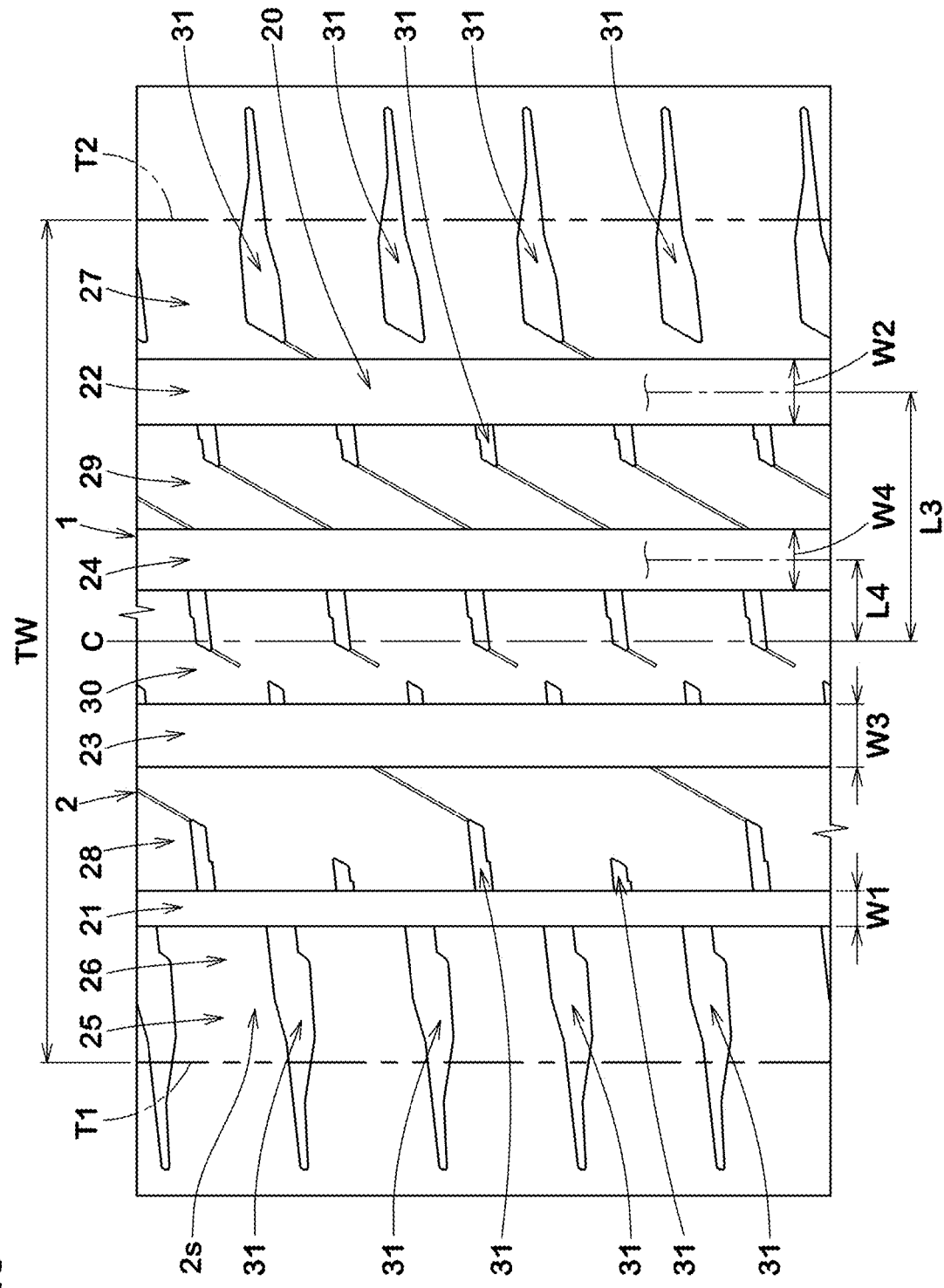
FIG. 6 is a development view of a ground contact surface of the tread portion of FIG. 1.

FIG. 6 illustrates a development view of the ground contact surface 2s of tread portion 2 of FIG. 1. As illustrated in FIG. 6, the tread portion 2 is provided with a plurality of circumferential grooves 20, for example. In the present embodiment, the circumferential grooves 20 are arranged between the first tread edge T1 and the second tread edge T2. The circumferential grooves 20 extend continuously in the tire circumferential direction. In the present embodiment, each circumferential groove 20, for example, extends linearly in parallel with the tire circumferential direction, for example. For example, each circumferential groove 20 may extend in a wavy manner.

In the present embodiment, the plurality of circumferential grooves 20 include a first shoulder circumferential groove 21, a second shoulder circumferential groove 22, a first crown circumferential groove 23 and a second crown circumferential groove 24. The first shoulder circumferential groove 21 is disposed between the first tread edge T1 and the tire equator C. In the present embodiment, the first shoulder circumferential groove 21 is disposed closest to the first tread edge T1 among the plurality of circumferential grooves 20. The second shoulder circumferential groove 22 is disposed between the second tread edge T2 and the tire equator C. In the present embodiment, the second shoulder circumferential groove 22 is disposed closest to the second tread edge T2 among the plurality of circumferential grooves 20. The first crown circumferential groove 23 is disposed between the first shoulder circumferential groove 21 and the tire equator C. The second crown circumferential groove 24 is disposed between the second shoulder circumferential groove 22 and the tire equator C.

It is preferable that a distance L3 in the tire axial direction from the tire equator C to the groove center line of each of the first shoulder circumferential groove 21 and the second shoulder circumferential groove 22 is, for example, in a range from 25% to 35% of the tread width TW. It is preferable that a distance L4 in the tire axial direction from the tire equator C to the groove center line of each of the first crown circumferential groove 23 and the second crown circumferential groove 24 is, for example, in a range from 5% to 15% of the tread width TW.

As illustrated in FIG. 4, it is preferable that that the groove width Wa of each of the circumferential grooves 20 is at least 3 mm or more. Further, it is preferable that the groove width of each of the circumferential grooves 20 is, for example, in a range from 4.0% to 8.5% of the tread width TW. Additionally, the total groove width of the plurality of circumferential grooves 20 is, for example, in a range from 20% to 30%, preferably 25% to 30% of the tread width TW. Thereby, it is possible to improve steering stability on dry roads while reducing the vehicle exterior noise. It is preferable that, in the case of pneumatic tires for passenger cars, the depth (not illustrated) of each of the circumferential grooves 20 is, for example, in a range from 5 to 10 mm.

As illustrated in FIG. 6, it is preferable that the groove width W3 of the first crown circumferential groove 23 is, for example, greater than the groove width W1 of the first shoulder circumferential groove 21. Specifically, the groove width W3 is in a range from 150% to 200% of the groove width W1. It is preferable that the groove width W4 of the second crown circumferential groove 24 is, for example, greater than the groove width W2 of the second shoulder circumferential groove 22. Specifically, the groove width W4 is not more than 140%, preferably in a range from 105% to 120%, of the groove width W2. In some more preferred aspect, the first shoulder circumferential groove 21 has a smallest groove width among the plurality of circumferential grooves 20. This makes it difficult for the noise generated by the circumferential grooves 20 to diffuse toward the outside of the vehicle while ensuring wet performance, therefore, the vehicle exterior noise can be reduced.

The plurality of land portions 25 includes a crown land portion 30, a first middle land portion 28, a second middle land portion 29, a first shoulder land portion 26 and a second shoulder land portion 27. The crown land portion 37 is defined between the first crown circumferential groove 23 and the second crown circumferential groove 24. The first middle land portion 28 is defined between the first shoulder circumferential groove 21 and the first crown circumferential groove 23. Thus, the first middle land portion 28 is adjacent to the crown land portion 30 via the first crown circumferential groove 23. The second middle land portion 29 is defined between the second shoulder circumferential groove 22 and the second crown circumferential groove 24. Thus, the second middle land portion 29 is adjacent to the crown land portion 30 via the second crown circumferential groove 24.

The first shoulder land portion 26 includes the first tread edge T1 and is defined on the outer side in the tire axial direction of the first shoulder circumferential groove 21. Thus, the first shoulder land portion 26 is adjacent to the first middle land portion 28 via the first shoulder circumferential groove 21. The second shoulder land portion 27 includes the second tread edge T2 and is defined on the outer side in the tire axial direction of the second shoulder circumferential groove 22. Thus, the second shoulder land portion 27 is adjacent to the second middle land portion 29 via the second shoulder circumferential groove 22.

These land portions 25 are each provided with a plurality of lateral grooves 31. The arrangement of the lateral grooves 31 shown in FIG. 6 is merely an example, and the present disclosure is not limited to such an example.

It is preferable that the first middle land portion 28 is not divided in the tire circumferential direction by grooves whose widths are 2 mm or more. Similarly, it is preferable that the crown land portion 30 and the second middle land portion 29 are not divided in the tire circumferential direction by grooves whose widths are 2 mm or more. Thereby, the pattern noise generated by these land portions can be reduced, and the vehicle exterior noise can be reduced.

It has been known that, generally, when the land ratio of the tread portion is decreased, the pattern noise increases and vehicle exterior noise increases. On the other hand, it has been known that, when the land ratio is increased, the pattern noise is reduced, but the vibration from the road surface is more likely to be transmitted to the vehicle through the tire, resulting in an increase in vehicle interior noise. For this reason, conventional tires are often designed with a relatively small land ratio (less than 65%).

In contrast, the land ratio of the tread portion 2 is equal to or more than 65% in the present embodiment. In this specification, the "land ratio" is defined as Sb/Sa, which is the ratio of the actual total ground area Sb to the total area Sa of the virtual ground surface after filling all the grooves and sipes on the ground surface 2s of the tread portion 2.

By setting the land ratio to 65% or more, the tire 1 of the present disclosure can be reduced in pattern noise, and as a result, it is possible to reduce the vehicle exterior noise. In the tire 1 according to the present disclosure, as the first thickness t1 (shown in FIG. 1) of the first portion 11 is large as described above, the tread portion 2 can effectively absorb vibrations from the road surface, and the vehicle interior noise can be reduced even if the land ratio of the tread portion 2 is large. For this reason, the present disclosure can reduce both the vehicle exterior noise and vehicle interior noise.

It is preferable that the land ratio Lac of the crown land portion 30 is greater than the land ratio Lam1 of the first middle land portion 28. Specifically, the land ratio Lac is greater than 105%, preferably 106% or more but less than 120%, of the land ratio Lam1. Thereby, the pattern noise generated by the crown land portion 30 can be reduced, and further, the steering stability and wear resistance performance on dry roads can be enhanced.

It is preferable that the land ratio Lam1 of the first middle land portion 28 is more than the land ratio Las' of the first shoulder land portion 26. Specifically, the land ratio Lam1 is more than 105% of the land ratio Las1, more specifically 106% or more but less than 120%. Thereby, it is possible to further enhance the steering stability and wear resistance on dry roads.

From a similar point of view, it is preferable that the land ratio Lam2 of the second middle land portion 29 is more than the land ratio Las2 of the second shoulder land portion 27. Specifically, the land ratio Lam2 is more than 105% of the land ratio Las2, more specifically 106% or more but less than 120%.

Figure 7:
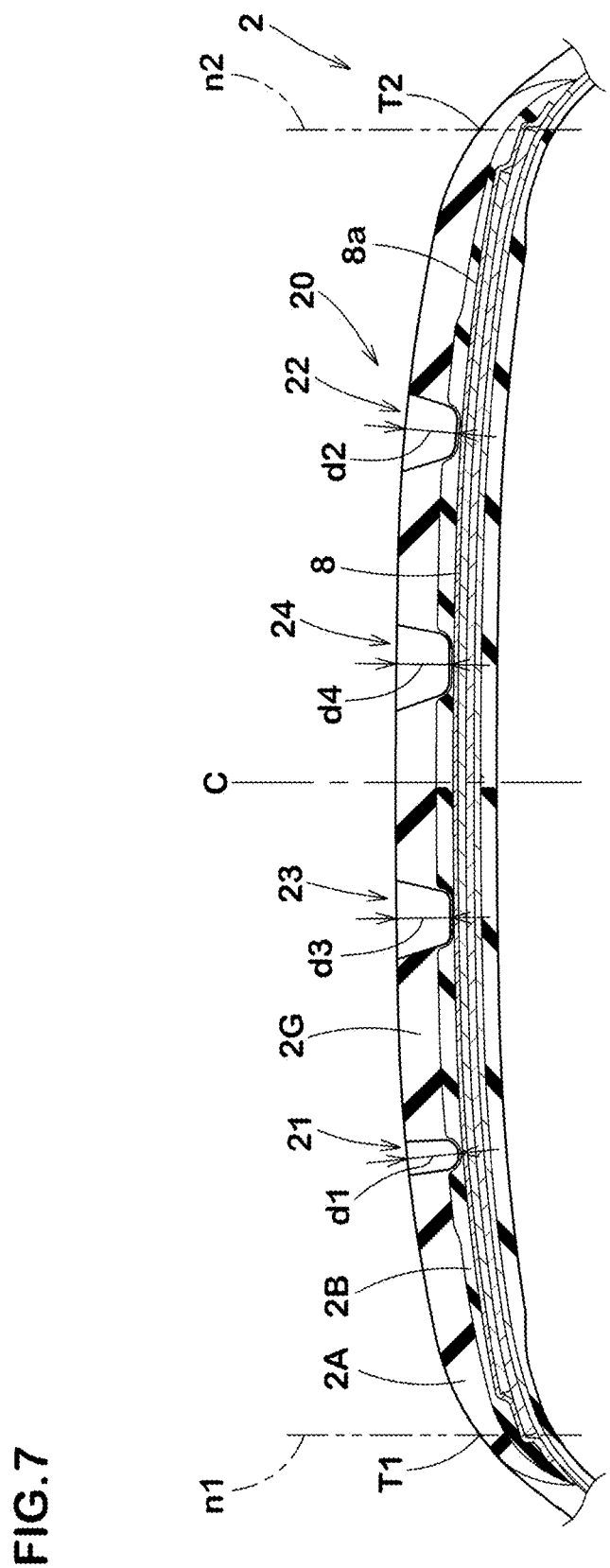
FIG. 7 is an enlarged cross-sectional view of the tread portion of FIG. 1.

FIG. 7 is a tire meridian cross-sectional view of the tread portion 2. As illustrated in FIG. 7, a groove depth d3 of the first crown circumferential groove 23 is the same as, for example, a groove depth d4 of the second crown circumferential groove 24. In the present embodiment, the groove depth d3 of the first crown circumferential groove 23 is greater than a groove depth d1 of the first shoulder circumferential groove 21 and a groove depth d2 of the second shoulder circumferential groove 22. As a result, the maximum value dx of the groove depth of the circumferential grooves 20 (shown in FIG. 1) is the groove depth d3 of the first crown circumferential groove 23 and the groove depth d4 of the second crown circumferential groove 24. Thus, by setting the groove depth d3 of the first crown circumferential groove 23 and the groove depth 4 of the second crown circumferential groove 24 adjacent to the tire equator C, where high ground contact pressure acts during straight driving, to the maximum groove depth value dx, the volume of the tread rubber 2G near the tire equator C can be reduced. This can further improve the rolling resistance performance. Preferably, although it is not limited, the groove depth d1 of the first shoulder circumferential groove 21 is, for example, in a range from 5 to 10 mm for a passenger car pneumatic tire. The groove depth d1 of the first shoulder circumferential groove 21 and the groove depth d2 of the second shoulder circumferential groove 22 are preferably at least 75% of the groove depth d3 of the first crown circumferential groove 23, more preferably equal to or more than 80%, but preferably equal to or less than 95%, more preferably equal to or less than 90%.

As illustrated in FIG. 1, the maximum value tx of the first thickness t1 of the first portion 11 is in a range from 0.25 to 0.60 times the maximum value dx of the groove depth d of the circumferential grooves 20. By adopting the above configuration, the rolling resistance performance can be improved while maintaining the noise performance and steering stability performance. The reasons may be as follows.

The inner rubber 10 can absorb vibrations from the road surface during driving, thus reducing the vehicle interior noise and enhancing the ground contact feeling, thus maintaining high noise performance and steering stability performance. In addition, the inner rubber 10 disposed inside the carcass 6 is less prone to compressive deformation when the tread portion 2 comes into contact with the ground, which can improve the rolling resistance performance. Furthermore, since the first portion 11 having a relatively thicker is provided in the tread portion 2, the vibration from the tread portion 2 can be effectively absorbed. In addition, since the maximum value of tx is equal to or more than 0.25 times the maximum value of dx, the absorption of vibration by the first portion 11 is effectively demonstrated. Furthermore, since the maximum value of tx is equal to or less than 0.60 times of the maximum value of dx, the excessive increase of the volume of the inner rubber 10 can be suppressed and the rolling resistance performance can be enhanced. In addition, the second portion 12, which is relatively small in thickness, is disposed in the sidewall portions 3, so that the increase of the tire mass can be suppressed. In order to effectively demonstrate such effects more effectively, the maximum value of tx is preferably equal to or more than 0.30 times the maximum value of dx, and equal to or less than 0.55 times the maximum value of dx.

As illustrated in FIG. 4, the first portion 11 includes a first end portion 13 on the first tread edge T1 side, a second end portion 14 on the second tread edge T2 side, and a center portion 15 located between the first end portion 13 and the second end portion 13. The center portion 15 includes a portion having the maximum value tx of the first thickness t1 (shown in FIG. 1). The thickness tc of the center portion 15 is substantially the same (maximum value tx) in the present embodiment.

In the first end portion 13, the first thickness t1 continuously decreases toward an outer end 11a on the first tread edge T1 side, of the first portion 11. In the second end portion 14, the first thickness t1 continuously decreases toward an outer end 11b on the second tread edge T2 side, of the first portion 11. In the present embodiment, the positions at which the decreasing of the first thickness t1 ends correspond to the outer ends 11a and 11b of the first portion 11 in the tire axial direction.

In the present embodiment, the outer end 11a on the first tread edge T1 side of the first portion 11 is positioned on the first tread edge T1 side with respect to the first crown circumferential groove 23, more preferably on the first tread edge T1 side with respect to the first shoulder circumferential groove 21. This can reduce the vehicle interior noise for sure. In addition, the outer end 11a on the first tread edge T1 side of the first portion 11 is located, for example, between the first shoulder circumferential groove 21 and the outer end 7a of the belt ply 7, more preferably between the first shoulder circumferential groove 21 and the outer edge 7b of the second belt ply 7B. This can improve the rolling resistance performance and noise performance in a well-balanced manner.

Figure 8:
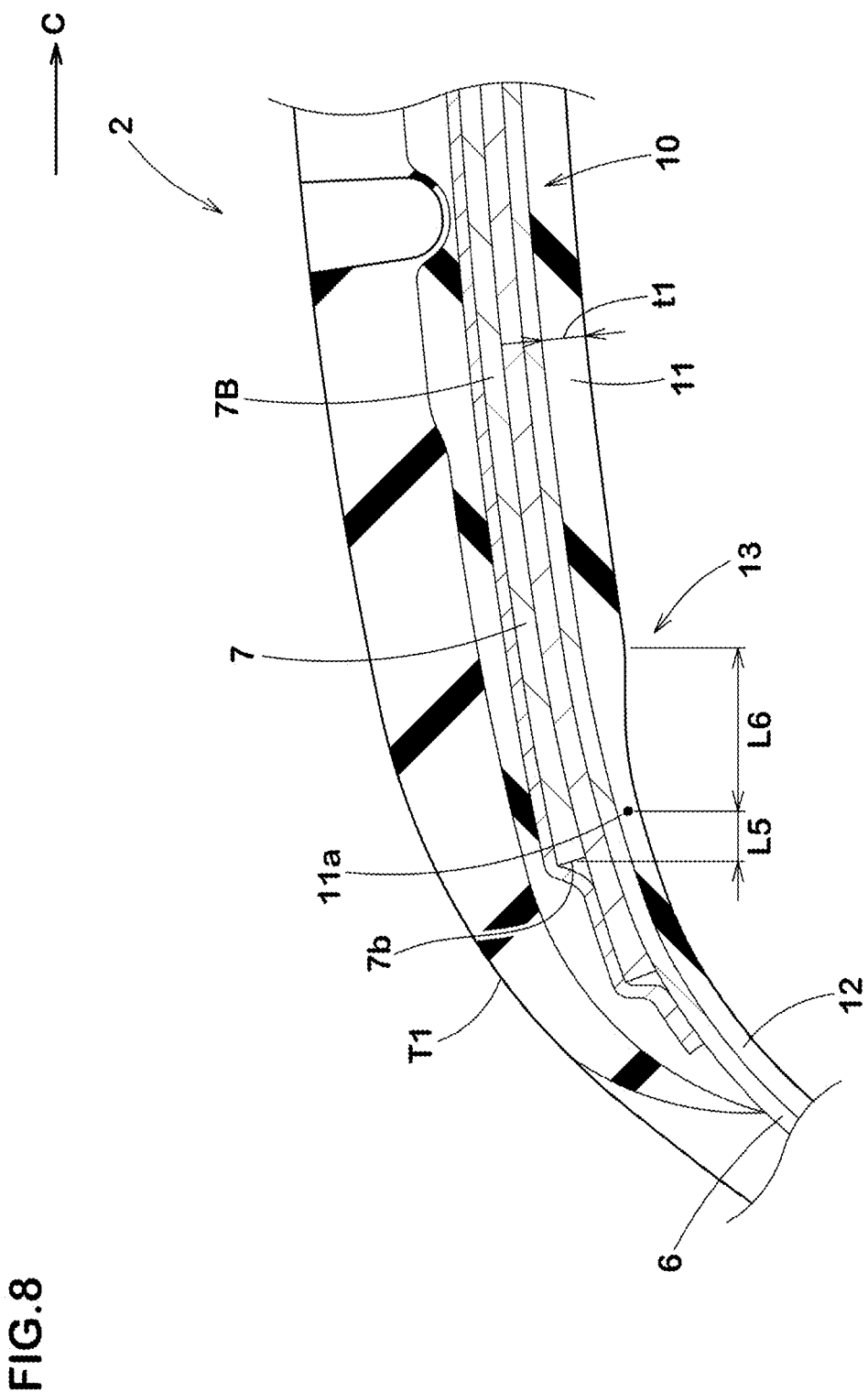
FIG. 8 is an enlarged view of FIG. 4 around a first tread edge.

In FIG. 8, there is shown an enlarged cross-sectional view of the first end portion 13 of the first portion 11. As illustrated in FIG. 8, it is preferable that the outer end 11a of the first portion 11 on the first tread edge T1 side is located at the same position in the tire axial direction as the outer end 7b in the tire axial direction of the second belt ply 7B, or on the inner side in the tire axial direction of the outer end 7b of the second belt ply 7B. In some more preferred embodiments, the distance L5 in the tire axial direction between the outer end 11a of the first portion 11 and the outer end 7b of the second belt ply 7B is equal to or less than 10 mm. Thereby, the deformation of a portion around the outer end 11a of the first portion 11 during running of the tire can be suppressed by the belt layer 7 while securing a sufficient length in the tire axial direction of the first portion 11, and as a result, separation of the inner rubber 10 around the outer end 11a can be suppressed. Therefore, the improvement of noise performance can be maintained over a long period of time.

In addition, the first end portion 13 is connected to a portion extending with a constant first thickness t1 on the tire equator C side. The length L6 in the tire axial direction of the first end portion 13 is in a range from 2.0% to 4.0% of the tread width TW (shown in FIG. 1). Thereby, the thickness of the inner rubber 10 can be prevented from abruptly changing, and damage such as separation of the inner rubber 10 can be suppressed.

As illustrated in FIG. 4, a length L7 in the tire axial direction of the first portion 11 is defined as a length in the tire axial direction from the outer end 11a on the first tread edge T1 side to the outer end 11b on the second tread edge T2 side of the first portion 11. It is preferable that the length L7 in the tire axial direction of the first portion 11 in the present embodiment is in a range from 90% to 110% of the tread width TW. Thereby, it is possible to reliably reduce the vehicle interior noise while suppressing an increase in tire weight. The length L7 of the first portion 11, for example, is equal to or more than 70% of the length L2 of the second belt ply 7B (shown in FIG. 1), more preferably equal to or more than 80%, but preferably equal to or less than 98%, more preferably equal to or less than 95%.

It is preferable that the length L7 of the first portion 11 is in a range from 65% to 85% the sectional width W (shown in FIG. 1). The vibration of the tread portion 2 can be suppressed over a wide area when the length L7 of the first portion 11 is equal to or more than 65% of the cross-sectional width W. The weight increase of the inner rubber 10 can be suppressed when the length L7 of the first portion 11 is equal to or less than 85% of the cross-sectional width W.

In the present embodiment, the first portion 11 has a first length L8 from the tire equator C to the outer end 11a on the first tread edge T1 side, and a second length L9 from the tire equator C to the outer end 11b on the second tread edge T1 side, and the first length L8 is substantially the same as the second length L9. More specifically, the difference between the first length L8 and the second length L9 is equal to or less than 5% the first length L8. In another embodiment, the second length L9 may be greater than the first length L8, for example. Specifically, the second length L9 may be in a range from 105% to 110% the first length L8. In such an embodiment, the length of the first portion 11 is sufficiently secured on the second tread edge T2 side, which is the inside of the vehicle when installed on the vehicle, and thus the vehicle interior noise can be further reduced.

The first portion 11 extends between the first end portion 13 and the second end portion 14 while keeping the constant first thickness t1. Thereby, the first thickness t1 is substantially the same at the position of the tire equator C and at positions on the first tread edge T1 side of the first shoulder circumferential groove 21. In some preferred aspect, the first thickness t1 is substantially the same from the position of the tire equator C to a position beyond the first shoulder circumferential groove 21. Here, the term "substantially the same" means that inevitable errors in rubber products such as tires are allowable, and it shall comprise an aspect in which the difference between the maximum value and minimum value of the thickness is not more than 5% of the maximum value.

In this embodiment, the outer end 11a of the first portion 11 is located inwardly in the tire axial direction with respect to the first tread edge T1. Such a tire 1 can maintain superior rolling resistance and high-speed durability performance because of the reduced mass of the tire. It is noted that the first portion 11 may extend to the first tread edge T1 with a constant first thickness t1 (not illustrated). That is, from the position of the tire equator C to a position of the first tread edge T1 (an imaginary line extending parallel to the tire radial direction through the first tread edge T1), the first thickness t1 may be substantially the same.

The first portion 11 has the same configuration on the second tread edge T2 side as on the first tread edge T1 side. The outer end 11b of the first portion 11 on the second tread edge T2 side is, for example, located on the second tread edge T2 side of the second crown circumferential groove 24, more preferably on the second tread edge T2 side of the second shoulder circumferential groove 22. In addition, it is preferable that the outer end 11b of the first portion 11 on the second tread edge T2 side is located at the same position in the tire axial direction as the outer end 7b in the tire axial direction of the second belt ply 7B, or on the inside in the tire axial direction of the outer end 7b of the second belt ply 7B. Further, the distance L5 in the tire axial direction between the outer end 11b of the first portion 11 and the outer end 7b of the second belt ply 7B is equal to or less than 10 mm. The second end portion 14 also has the same configuration as the first end portion 13.

Further, the first thickness t1 is substantially the same at the position of the tire equator C and at a position on the second tread edge T2 side of the second shoulder circumferential groove 22, for example. In some preferred embodiments, the first thickness t1 is substantially the same from the position of the tire equator C to a position beyond the second shoulder circumferential groove 22. Furthermore, the outer end 11b of the first portion 11, for example, is located inwardly in the tire axial direction with respect to the second tread edge T2.

It is preferable that the average value of the first thickness t1 is in a range from 1.5 to 3.5 times the average value of the second thickness t2 (shown in FIG. 1). Specifically, the average value of the first thickness t1 is preferably equal to or more than 1.5 times, more preferably equal to or more than 1.75 times, even more preferably equal to or more than 1.9 times, but preferably equal to or less than 3.5 times, more preferably equal to or less than 2.7 times, even more preferably equal to or less than 2.2 times of the average value of the second thickness t2. Thereby, it is possible to reliably reduce the vehicle interior noise while suppressing an increase in the weight of the tire 1.

From a similar point of view, the average value of the first thickness t1 is preferably equal to or more than 2.0 mm, more preferably equal to or more than 2.5 mm, but preferably equal to or less than 4.5 mm, more preferably equal to or less than 4.0 mm, even more preferably equal to or less than 3.5 mm. On the other hand, the average value of the second thickness t2 is, for example, more than 0.5 mm, and less than 2.0 mm. In some preferred embodiments, the average value of the second thickness t2 may be in a range from 1.0 to 1.5 mm. Each second portion 12 of the present embodiment is connected to the first portion 11 and extends to the respective bead portion 4 (shown in FIG. 1), and the second thickness t2 is constant throughout. However, the second portion 12 is not limited to such an aspect.

It is preferable that the average value of the first thickness t1 is equal to or more than 0.45% of the outer diameter DM of the tire 1 (shown in FIG. 3). As a result, the influence of the horn effect on the noise performance can be further suppressed, which is expected to improve the noise performance of the tire 1.

It is preferable that the average value of the first thickness t1 is in a range from 30% to 60% of the maximum depth of the circumferential grooves 20. The maximum depth means the maximum one among the depth of the first shoulder circumferential groove 21, the depth of the second shoulder circumferential groove 22, the depth of the first crown circumferential groove 23, and the depth of the second crown circumferential groove 24.

The influence of the horn effect on the noise performance can be further suppressed when the average value of the first thickness t1 is equal to or more than 30% of the maximum depth. The weight increase of the inner rubber 10 can be suppressed when the average value of the first thickness t1 is equal to or less than 60% of the maximum depth.

It has been confirmed by the inventor that by setting the twist coefficient K of the carcass cord 6B in a range from 2000 to 2500 and the average value of the first thickness t1 of the first portion 11 in a range from 2.0 mm to 4.5 mm, the vehicle interior noise in the low frequency band equal to or lower than 160 Hz, the medium frequency band from 160 Hz to 350 Hz and the high frequency band equal to or higher than 350 Hz can be reduced.

Further, it has been confirmed by the inventor that by setting the twist coefficient K of the carcass cord 6B in a range from 2000 to 2500 and the average value of the first thickness t1 of the first portion 11 in a range from 2.0 mm to 3.5 mm, the rolling resistance does not deteriorate.

In the present embodiment, the first portion 11 and the second portions 12 of the inner rubber 10 are made of an air impermeable rubber material. As such a rubber material, for example, a butyl-based rubber material or halogenated butyl-based rubber material can be employed. In the present embodiment, the first portion 11 and the second portions 12 are made of the same rubber material.

The tread portion 2 includes a tread rubber 2G which forms the ground contact surface 2s. The tread portion 2 includes, for example, a cap rubber 2A forming the ground contact surface 2s, and a base rubber 2B disposed inside the cap rubber 2A in the tire radial direction. The tread portion 2 is not limited to such example, and may be composed of, for example, a single layer of a rubber material, or three or more layers of rubber materials.

The volume V2 of the inner rubber 10 is preferably equal to or more than 0.30 times the volume V1 of the tread rubber 2G, more preferably equal to or more than 0.35 times, but preferably equal to or less than 0.50 times, more preferably equal to or less than 0.45 times. When the volume V2 of the inner rubber 10 is equal to or more than 0.30 times the volume V1 of the tread rubber 2G, the noise performance and the steering stability performance can be kept high. When the volume V2 of the inner rubber 10 is equal to or less than 0.50 times the volume V1 of the tread rubber 2G, the increase of the tire mass can be suppressed and the rolling resistance performance can be improved. As used herein, the volume V1 of tread rubber 2G is the total volume of wearable material disposed between the tire radial line n1 passing through the first tread edge T1 (shown in FIG. 7) and the tire radial line n2 passing through the second tread edge T2. Here, the wearable material is the rubber material sandwiched between the outermost surface of the reinforcing layer located radially outwardly of the carcass 6 and the ground contact surface 2s. The reinforcing layer means a ply material composed of cords and topping rubber. In this embodiment, the outermost surface is the outer surface 8a on the ground contact surface 2s side of the band layer 8. The volume V1 of the tread rubber 2G shall include the cavity volume of the recesses formed in the ground contact surface 2s. The recesses shall include grooves and sipes except for the circumferential grooves that extend continuously in the tire circumferential direction. In the present embodiment, the volume V1 of the tread rubber 2G is composed of the cap rubber 2A and the base rubber 2B.

As illustrated in FIG. 4, in the present embodiment, the loss tangent tan δ1 of the first portion 11 at 70 degrees C. is preferably equal to or greater than the loss tangent tan δ2 of the second portion 12 at 70 degrees C. The first portion 11 can help to suppress the vibration of the tread portion 2 and can improve the noise performance of the pneumatic tire 1.

It is preferable that the loss tangent tan δ1 of the first portion 11 at 70 degrees C. is equal to or less than the loss tangent tan δA of the tread rubber 2G at 30 degrees C. The tread rubber 2G forming the ground contact surface 2s is cooled by contacting with the outside air, so the measured temperature is set at 30 degrees C. Such a first portion 11 can further reduce the influence of the tread portion 2 on the rolling resistance, and is useful for improving the fuel efficiency performance of the tire 1. Therefore, the tire 1 according to the present embodiment can achieve both the noise performance and low fuel consumption performance.

Here, the loss tangent tan δ is measured according to JIS-K6394 by using a dynamic viscoelasticity measuring device under the following conditions. The rubber sample for measuring the loss tangent tan δ is taken out from the vulcanized tire 1 such that the longitudinal direction of the sample coincides with the circumferential direction of the tire 1.

Measurement temperature: 30 degrees C. or 70 degrees C.
Initial strain: 5% when measuring temperature is 30 degrees C. or 10% when measuring temperature is 70 degrees C.
Amplitude of dynamic strain: +/−1%
Frequency: 10 Hz
Deformation Mode: Tensile Incidentally, the loss tangent tan δ can be adjusted by appropriately changing the glass transition point Tg of the rubber composition and/or the types and amounts of various compounding agents. For example, it is possible to increase the loss tangent tan δ by: increasing the glass transition point Tg of the rubber composition; decreasing the average particle size of reinforcing agents such as carbon and silica; increasing the amount of reinforcing agent; and/or decreasing the amount of vulcanizing agent such as sulfur and accelerators.

Here, when the first portion 11 is made of a single rubber material, the loss tangent tan δ1 of the first portion 11 is that of the single rubber material. When the first portion 11 is composed of a plurality of rubber materials, the loss tangent tan δ1 of the first portion 11 is a weighted average obtained by weighting the loss tangent tan δ1 values of the rubber materials by the cross-sectional areas of the respective rubber materials. The same applies to the loss tangents tan δ of the other portions.

As a more preferred aspect, the loss tangent tan δ1 of the first portion 11 at 70 degrees C. is in a range from 1.0 to 2.0 times the loss tangent tan δ2 of the second portion 12 at 70 degrees C. As the loss tangent tan δ1 of the first portion 11 at 70 degrees C. is not less than 1.0 times the loss tangent tan δ2 of the second portion 12 at 70 degrees C., the vibration suppressing effect of the tread portion 2 can be achieved reliably. From this point of view, the loss tangent tan δ1 of the first portion 11 at 70 degrees C. is more preferably equal to or more than 1.1 times the loss tangent tan δ2 of the second portion 12 at 70 degrees C.

As the loss tangent tan δ1 of the first portion 11 at 70 degrees C. is equal to or less than 2.0 times the loss tangent tan δ2 of the second portion 12 at 70 degrees C., damage such as separation due to an excessive difference in physical properties can be suppressed, and the durability performance of the tire 1 can be improved. From this point of view, the loss tangent tan δ1 of the first portion 11 at 70 degrees C. is more preferably equal to or less than 1.5 times the loss tangent tan δ2 of the second portion 12 at 70 degrees C.

The loss tangent tan δ1 of the first portion 11 at 70 degrees C. is preferably in a range from 0.4 to 0.7 times the loss tangent tan δA of the tread rubber 2G at 30 degrees C. By setting the loss tangent tan δ1 of the first portion 11 at 70 degrees C. to be equal to or more than 0.4 times the loss tangent tan δA of the tread rubber 2G at 30 degrees C., vibrations of the tread portion 2 can be reduced while maintaining the fuel efficiency of the tire 1.

As the loss tangent tan δ1 of the first portion 11 at 70 degrees C. is equal to or less than 0.7 times the loss tangent tan δA of the tread rubber 2G at 30 degrees C., vibrations of the tread portion 2 can be reduced while maintaining the high-speed durability performance of the tire 1.

The loss tangent tan δ1 of the first portion 11 at 70 degrees C. is preferably equal to or more than 0.14. As the loss tangent tan δ1 of the first portion 11 at 70 degrees C. is equal to or more than 0.14, vibrations of the tread portion 2 can be reliably suppressed, and noise generation can be reduced. From this point of view, the loss tangent tan δ1 of the first portion 11 at 70 degrees C. is more preferably equal to or more than 0.15, still more preferably equal to or more than 0.20.

The loss tangent tan δ of the first portion 11 at 30 degrees C. is preferably in a range from 0.4 to 0.7 times the loss tangent tan δ of the tread rubber 2G at 30 degrees C. By setting the loss tangent tan δ of the first portion 11 to be equal to or more than 0.4 times the loss tangent tan δ of the tread rubber 2G, vibrations of the tread portion 2 can be reduced. By setting the loss tangent tan δ of the first portion 11 to be equal to or less than 0.7 times the loss tangent tan δ of the tread rubber 2G, the rolling resistance of the tire can be reduced.

In the tire 1 according to the present embodiment, owing to the synergistic effect of the carcass cords 6B having a twist coefficient K of from 2000 to 2500 and the rubber of the first portion 11 having the loss tangent tan δ, it becomes possible to more easily reduce the vehicle interior noise without increasing rolling resistance.

Preferably, the loss tangent tan δ of the first portion 11 at 30 degrees C. is in a range from 0.4 to 0.7 times the loss tangent tan δ of the base rubber at 30 degrees C. As the loss tangent tan δ of the first portion 11 is equal to or more than 0.4 times the loss tangent tan δ of the base rubber, vibrations of the tread portion 2 can be reliably suppressed, and noise generation can be reduced. As the loss tangent tan δ of the first portion 11 is equal to or less than 0.7 times the loss tangent tan δ of the base rubber, the rolling resistance of the tire 1 can be reduced.

It is preferable that the loss tangent tan δ2 of the second portion 12 at 70 degrees C. is the same as the loss tangent tan δ1 of the first portion 11 at 70 degrees C. Such an inner rubber 10 allows the first portion 11 and the second portion 12 to be formed as a single piece and helps to reduce the production cost of the pneumatic tire 1.

The loss tangent tan δA of the tread rubber 2G at 30 degrees C. is preferably equal to or less than 0.30. As the loss tangent tan δA of the tread rubber 2G at 30 degrees C. is not more than 0.30, the rolling resistance can be reduced, which makes it possible to improve the fuel economy performance of the tire 1. From this point of view, the loss tangent tan δA of the tread rubber 2G is more preferably equal to or less than 0.25, still more preferably equal to or less than 0.20.

When the tread portion 2 is composed of a plurality of rubber materials, the tread rubber 2G is the rubber material forming the ground contact surface 2s, for example, the loss tangent tan δA of the tread rubber 2G means the loss tangent of the rubber material that constitutes the ground contact surface 2s (for example, the cap rubber 2A). It is also preferable that the loss tangent tan δB of the base rubber 2B at 70 degrees C. is smaller than the loss tangent tan δA of the cap rubber 2A at 30 degrees C. Such a tread portion 2 can help to improve the fuel economy performance while maintaining superior high-speed durability performance of the tire 1.

The loss tangent tan δB of the base rubber 2B at 70 degrees C. is preferably equal to or less than 0.21. As the loss tangent tan δB of the base rubber 2B at 70 degrees C. is not more than 0.21, heat generation in the tread portion 2 during driving can be suppressed, which helps to maintain superior fuel efficiency performance of the tire 1. From this point of view, the loss tangent tan δB of the base rubber 2B at 70 degrees C. is more preferably equal to or less than 0.20.

Figure 9:
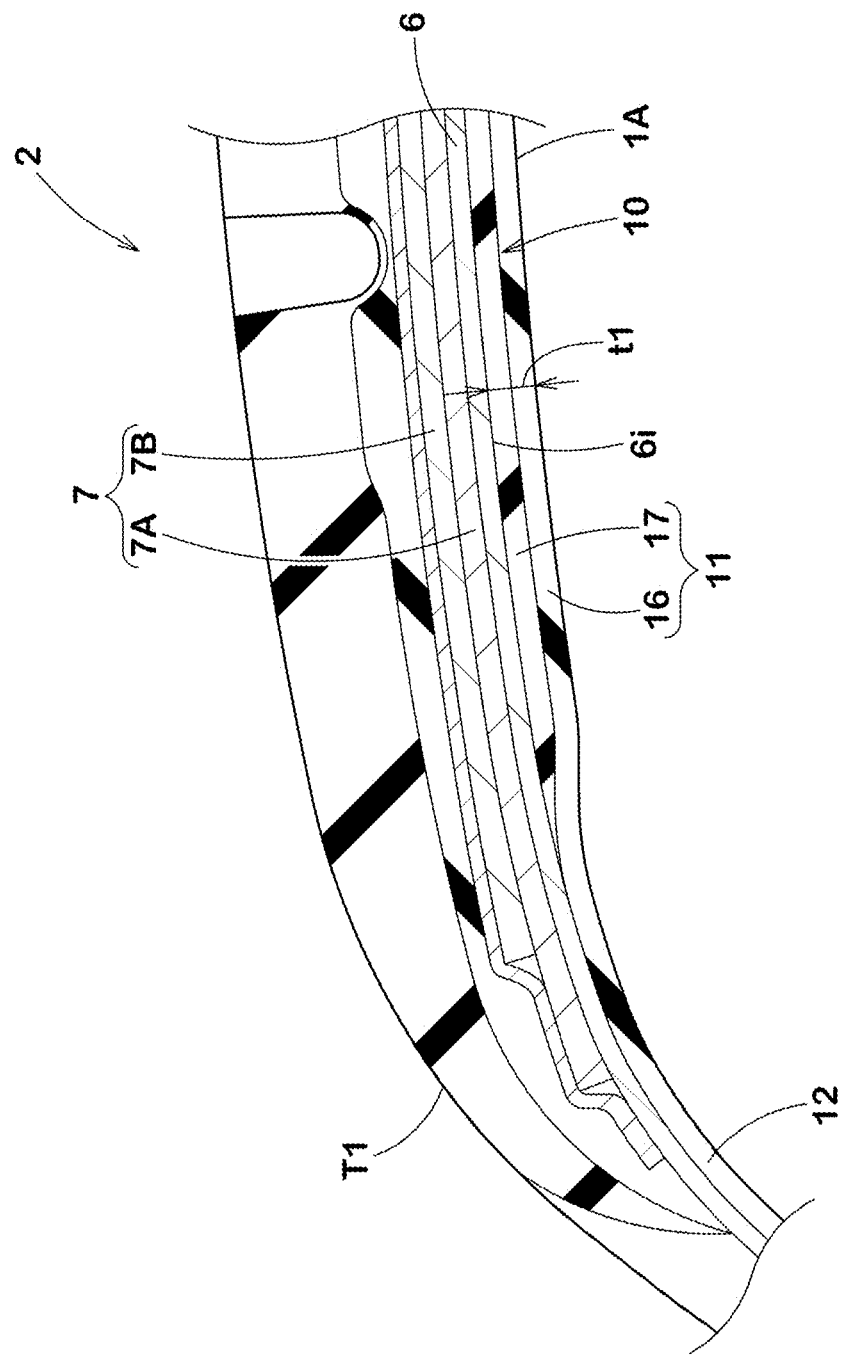
FIG. 9 is a cross-sectional view of a portion around the first tread edge according to another embodiment.

FIG. 9 illustrates a cross-sectional view of a portion around the first tread edge T1 of the tread portion 2 according to another embodiment.

As shown in FIG. 9, the first portion 11 of the inner rubber 10 of this embodiment includes an inner liner layer 16 made of an air-impermeable rubber material (hereinafter referred to as the first rubber material), and an additional layer 17 disposed between the inner liner layer 16 and the carcass 6. The additional layer 17 is made of a second rubber material different from the first rubber material. As the second rubber material, for example, a rubber material having air permeability is employed. That is, the first portion 11 of this embodiment is formed by combining the air-impermeable rubber material and the air-permeable rubber material.

In this embodiment, as the first portion 11 includes the additional layer 17, it is possible to improve various performances. For example, as the second rubber material forming the additional layer 17, a rubber material having a loss tangent tan δ larger than that of the first rubber material forming the inner liner layer 16 may be employed. In this case, the maximum value of the loss tangent tan δ1 of the first portion 11 is the loss tangent tan δ of the additional layer 17. Further, the maximum value of the loss tangent tan δ2 of the second portion 12 corresponds to the loss tangent tan δ of the inner liner layer 16. This embodiment allows the tread portion 2 to absorb more vibration from the road surface during driving and the vehicle interior noise can be further reduced.

The loss tangent tan δ of the air-impermeable rubber material at 70 degrees C. is preferably equal to or more than 0.14. With this, the vibration of the tread portion 2 can be further reduced.

Figure 10:
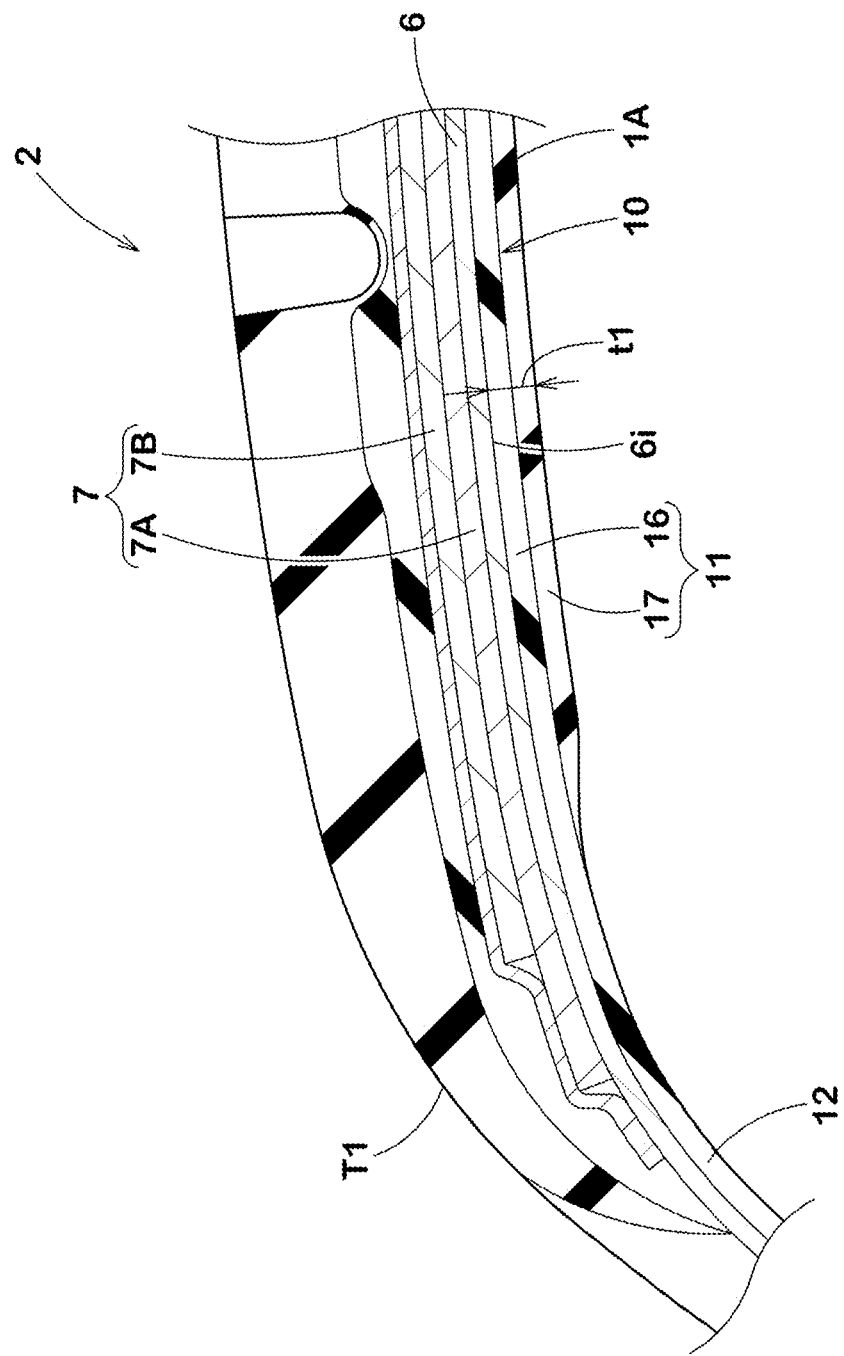
FIG. 10 is a cross-sectional view of a portion around the first tread edge according to yet another embodiment.

The arrangement position of the additional layer 17 is not limited to the embodiment shown in FIG. 9. FIG. 10 illustrates an enlarged cross-sectional view of the first portion 11 and the second portion 12 of yet another embodiment. As shown in FIG. 10, the additional layer 17 may be arranged inside the inner liner layer 16 in the tire radial direction. Moreover, the additional layer 17 may constitute a part of the tire inner cavity surface 1A.

As illustrated in FIG. 9 and FIG. 10, even when the first portion 11 of the inner rubber 10 includes the additional layer 17, the first thickness t1 corresponds to the thickness from the inner surface 6i of the carcass 6 in the tread portion 2 to the tire inner cavity surface 1A.

Figure 11:
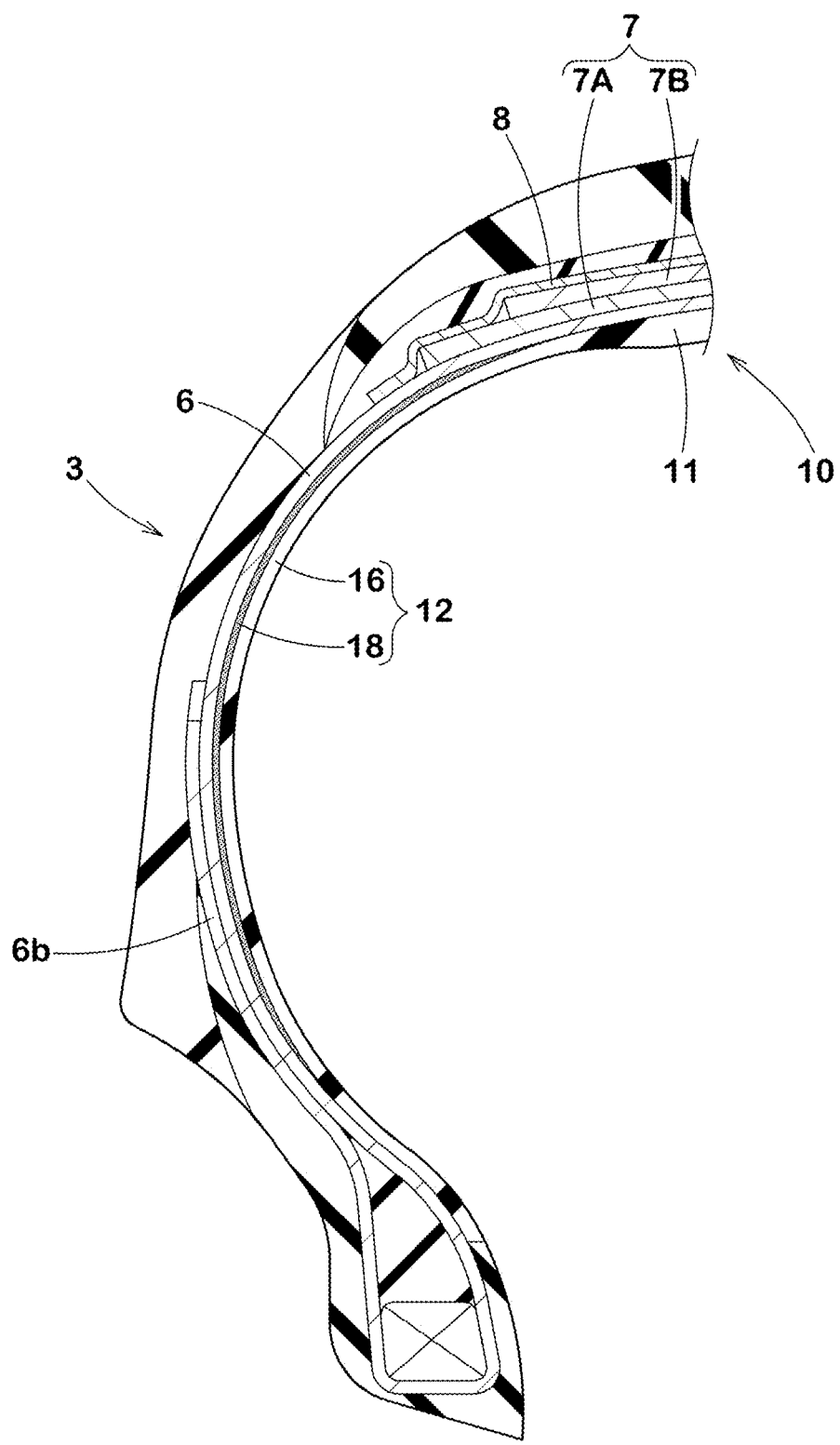
FIG. 11 is an enlarged cross-sectional view of a sidewall portion according to yet another embodiment.

FIG. 11 illustrates an enlarged cross-sectional view of one of the sidewall portions 3 of another embodiment of the present disclosure. As illustrated in FIG. 11, the second portion 12 according to this embodiment includes an inner liner layer 16 made of an air impermeable first rubber material, and an intermediate layer 18 disposed between the inner liner layer 16 and the carcass 6. In FIG. 11, the intermediate layer 18 is dotted. The intermediate layer 18 is made of a rubber material different from the first rubber material. The intermediate layer 18 may be made of, for example, the same second rubber material as the additional layer 17 of the first portion 11 described with reference to FIG. 9 and FIG. 10. As a result of the second portion 12 including such intermediate layer 18, it is possible to further suppress the transmission of vibrations generated in the tread portion 2 to the vehicle. It may be possible that the intermediate layer 18 is made of a rubber material different from the first rubber material and the second rubber material.

The intermediate layer 18 is, for example, overlapped with the band layer 8 in the tire axial direction. In some preferred embodiments, the intermediate layer 18 is overlapped with the belt layer 7 in the tire axial direction. The intermediate layer 18 may be continuous with the first portion 11 of the inner rubber 10. In addition, it is preferable that the intermediate layer 18 extends to the inner side in the tire radial direction than the outer end in the tire radial direction of the turn-up portion 6b of the carcass 6. In other words, in this embodiment, the intermediate layer 18 overlaps with the turn-up portion 6b in the tire radial direction. Such an intermediate layer 18 can help to further reduce the vehicle interior noise.

While detailed description has been made of preferred embodiments of the present disclosure, the present disclosure can be embodied in various modes without being limited to the illustrated embodiments.

[Additional Note]

The present disclosure includes the following aspects.

[Disclosure 1]

A pneumatic tire comprising:
a tread portion;
a pair of sidewall portions;
a pair of bead portions;
a carcass extending between the pair of bead portions; and
an inner rubber extending between the pair of bead portions on an inner side of the carcass; wherein
the inner rubber comprises a first portion extending in the tread portion with a first thickness and a second portion extending in each of or one of the pair of sidewall portions with a second thickness,
the first thickness is greater than the second thickness, and
in a tire meridian cross-section, a cross-sectional area of the inner rubber is in a range from 1.5% to 10% of an inner-cavity cross-sectional area of the pneumatic tire.

[Disclosure 2]

The pneumatic tire according to disclosure 1, wherein an average value of the first thickness is in a range from 1.5 to 3.5 times an average value of the second thickness.

[Disclosure 3]

The pneumatic tire according to disclosure 1 or 2, wherein the average value of the first thickness is in a range from 2.0 to 4.5 mm.

[Disclosure 4]

The pneumatic tire according to any one of disclosures 1 to 3, wherein
a cross-sectional width of the tire is in a range from 205 to 325 mm,
an aspect ratio of the tire is in a range from 25% to 65%, and
a rim diameter on which the pneumatic tire is to be mounted is in a range from 16 to 22 inches.

[Disclosure 5]

The pneumatic tire according to any one of disclosures 1 to 4, wherein
the tread portion comprises a first tread edge, a tire equator, a first shoulder circumferential groove arranged between the tire equator and the first tread edge,
the first portion of the inner rubber has an outer end in a tire axial direction on a first tread edge side with respect to the tire equator, and
the outer end is located outwardly in the tire axial direction of the first shoulder circumferential groove.

[Disclosure 6]

The pneumatic tire according to any one of disclosures 1 to 5, wherein
the tread portion comprises a tread rubber forming a ground contact surface,
a loss tangent tan δ1 of the first portion at 70 degrees C. is equal to or greater than a loss tangent tan δ2 of the second portion at 70 degrees C. and is equal to or less than a loss tangent tan δA of the tread rubber at 30 degrees C.

[Disclosure 7]

The pneumatic tire according to any one of disclosures 1 to 6, wherein
the tread portion comprises a plurality of circumferential grooves extending continuously in a tire circumferential direction, and
a maximum value of the first thickness of the first portion is in a range from 0.25 to 0.60 times a maximum value of groove depths of the plurality of circumferential grooves.

[Disclosure 8]

The pneumatic tire according to disclosure 7, wherein
the tread portion comprises a tread rubber forming a ground contact surface, and
a volume of the inner rubber is in a range from 0.30 to 0.50 times a volume of the tread rubber.

[Disclosure 9]

The pneumatic tire according to disclosure 7 or 8, wherein the first portion is made of a composite of an air-impermeable rubber material and an air-permeable rubber material.

[Disclosure 10]

The pneumatic tire according to any one of disclosures 1 to 9, wherein
an outer diameter of the tire is equal to or more than 660 mm in a normal state that the tire is mounted on a standard wheel rim with normal internal pressure but loaded with no tire load,
the tread portion comprises a plurality of circumferential grooves extending continuously in a tire circumferential direction, and
a total groove width of the plurality of circumferential grooves is in a range from 25% to 30% of a tread width of the tread portion.

[Disclosure 11]

The pneumatic tire according to disclosure 10, wherein
a cross-sectional width of the tire in the normal state is equal to or more than 225 mm.

[Disclosure 12]

The pneumatic tire according to disclosure 11, wherein
a length in the tire axial direction of the first portion is in a range from 65% to 85% of the cross-sectional width.

[Disclosure 13]

The pneumatic tire according to any one of disclosures 10 to 12, wherein
the first thickness is equal to or more than 0.45% of the outer diameter.

[Disclosure 14]

The pneumatic tire according to ay one of disclosures 1 to 13, wherein
the carcass comprises carcass cords, and
the carcass cords have a twist coefficient in a range from 2000 to 2500.

[Disclosure 15]

The pneumatic tire according to disclosure 14, wherein
the tread portion comprises a tread rubber forming a ground contact surface, and
a loss tangent tan δ1 of the first portion at 70 degrees C. is equal to or less than a loss tangent tan δA of the tread rubber at 30 degrees C.

[Disclosure 16]

The pneumatic tire according to disclosure 15, wherein
the loss tangent tan δ1 of the first portion is in a range from 0.4 to 0.7 times the loss tangent tan δA of the tread rubber.

[Disclosure 17]

The pneumatic tire according to any one of disclosures 14 to 16, wherein
the carcass comprises a main portion extending between the pair of bead portions, and a pair of turn-up portions connected to the main portion and each turned up around a respective bead core from the inside to outside in the tire axial direction, and
an outer end of at least one of the turn-up portions is positioned outwardly in the tire radial direction of a maximum width position of the main portion.

[Disclosure 18]

The pneumatic tire according to any one of disclosures 1 to 17, wherein
the tread portion comprises a plurality of circumferential grooves extending continuously in a tire circumferential direction, and
a maximum value of the first thickness of the first portion is in a range from 0.25 to 0.60 times a maximum value of groove depths of the plurality of circumferential grooves, and
a total groove width of the plurality of circumferential grooves is in a range from 25% to 30% of a tread width of the tread portion.

[Disclosure 19]

The pneumatic tire according to any one of disclosures 1 to 18, wherein
the tread portion comprises a plurality of circumferential grooves extending continuously in a tire circumferential direction,
the carcass comprises carcass cords,
a maximum value of the first thickness of the first portion is in a range from 0.25 to 0.60 times a maximum value of groove depths of the plurality of circumferential grooves, and
the carcass cords have a twist coefficient in a range from 2000 to 2500.

[Disclosure 20]

The pneumatic tire according to any one of disclosures 1 to 19, wherein
the tread portion comprises a plurality of circumferential grooves extending continuously in a tire circumferential direction, the carcass comprises carcass cords,
a maximum value of the first thickness of the first portion is in a range from 0.25 to 0.60 times a maximum value of groove depths of the plurality of circumferential grooves,
a total groove width of the plurality of circumferential grooves is in a range from 25% to 30% of a tread width of the tread portion, and
the carcass cords have a twist coefficient in a range from 2000 to 2500.

The invention claimed is:
1. A pneumatic tire comprising:
a tread portion;
a pair of sidewall portions;
a pair of bead portions;
a carcass extending between the pair of bead portions;
a belt layer arranged outside the carcass in a tire radial direction; and
an inner rubber extending between the pair of bead portions on an inner side of the carcass; wherein
the inner rubber comprises a first portion extending in the tread portion with a first thickness and a second portion extending in each of or one of the pair of sidewall portions with a second thickness,
the first thickness is greater than the second thickness,
the first thickness and the second thickness are measured from an inner surface of the carcass to a tire inner cavity surface,
in a tire meridian cross-section, a cross-sectional area of the inner rubber is in a range from 1.5% to 10% of an inner-cavity cross-sectional area of the pneumatic tire,
the tread portion comprises a first tread edge, a tire equator, a first shoulder circumferential groove arranged between the tire equator and the first tread edge,
the first portion of the inner rubber has an outer end in a tire axial direction on a first tread edge side with respect to the tire equator,
the outer end of the first portion is located outwardly in the tire axial direction of the first shoulder circumferential groove and between the first shoulder circumferential groove and an outer end on the first tread edge side of the belt layer,
the first portion includes a first end portion on the first tread edge side,
in the first end portion, the first thickness continuously decreases toward the outer end of the first portion,
a position at which the decrease of the first thickness ends corresponds to the outer end of the first portion, and
a loss tangent tan $\delta 1$ of the first portion at 70 degrees C. is equal to or more than 1.1 times and equal to or less than 1.5 times the loss tangent tan $\delta 2$ of the second portion at 70 degrees C.
2. The pneumatic tire according to claim 1, wherein an average value of the first thickness is in a range from 1.5 to 3.5 times an average value of the second thickness.
3. The pneumatic tire according to claim 1, wherein the average value of the first thickness is in a range from 2.0 to 4.5 mm.
4. The pneumatic tire according to claim 1, wherein
a cross-sectional width of the tire is in a range from 205 to 325 mm,
as aspect ratio of the tire is in a range from 25% to 65%, and
a rim diameter on which the pneumatic tire is to be mounted is in a range from 16 to 22 inches.

5. The pneumatic tire according to claim 1, wherein
the tread portion comprises a tread rubber forming a ground contact surface, and
the loss tangent $\delta 1$ is equal to or greater than a loss tangent tan $\delta A$ of the tread rubber at 30 degrees C.
6. The pneumatic tire according to claim 1, wherein
the tread comprises a plurality of circumferential grooves extending continuously in a tire circumferential direction, and
a maximum value of the first thickness of the first portion is in a range from 0.25 to 0.60 times a maximum value of groove depths of the plurality of circumferential grooves.
7. The pneumatic tire according to claim 6, wherein
the tread portion comprises a plurality of circumferential grooves extending continuously in a tire circumferential direction, and
a volume of the inner rubber is in a range from 0.30 to 0.50 times a volume of the tread rubber.
8. The pneumatic tire according to claim 6, wherein
the first portion is made of a composite of an air-impermeable rubber material and an air-permeable rubber material.
9. The pneumatic tire according to claim 1, wherein
an outer diameter of the tire is equal to or more than 660 mm in a normal state that the tire is mounted on a standard wheel rim with normal internal pressure but loaded with no tire load,
the tread portion comprises a plurality of circumferential grooves extending continuously in a tire circumferential direction, and
a total groove width of the plurality of circumferential grooves is in a range from 25% to 30% of a tread width of the tread portion.
10. The pneumatic tire according to claim 9, wherein a cross-sectional width of the tire in a normal state is equal to or more than 225 mm.
11. The pneumatic tire according to claim 10, wherein a length in a tire axial direction of the first portion is in a range from 65% to 85% of the cross-sectional width.
12. The pneumatic tire according to claim 9, wherein the first thickness is equal to or more than 0.45% of the outer diameter of the tire.
13. The pneumatic tire according to claim 1, wherein
the carcass comprises carcass cords, and
the carcass cords have a twist coefficient in a range from 2000 to 2500.
14. The pneumatic tire according to claim 13, wherein
the tread portion comprises a tread rubber forming a ground contact surface, and
the loss tangent tan $\delta 1$ of the first portion at 70 degrees C. is equal to or less than a loss tangent tan $\delta A$ of the tread rubber at 30 degrees C.
15. The pneumatic tire according to claim 14, wherein
the loss tangent $\delta 1$ of the first portion is in a range from 0.4 to 0.7 times the loss tangent tan $\delta A$ of the tread rubber.
16. The pneumatic tire according to claim 8, wherein the air-permeable rubber material has a loss tangent tan $\delta$ larger than a loss tan $\delta$ of the air-impermeable rubber material.
17. The pneumatic tire according to claim 1, wherein
the belt layer includes a first belt ply adjacent to the carcass and a second belt ply arranged radially outside the first belt ply,
the second belt ply has a length in the tire axial direction smaller than a length in the tire axial direction of the first belt ply, the outer end of the first portion is located between the first shoulder circumferential groove and an outer end on the first tread edge side of the second belt ply.

18. A pneumatic tire comprising:
a tread portion;
a pair of sidewall portions;
a pair of bead portions;
a carcass extending between the pair of bead portions; and
an inner rubber extending between the pair of bead portions on an inner side of the carcass; wherein
the inner rubber comprises a first portion extending in the tread portion with a first thickness and a second portion extending in each of or one of the pair of sidewall portions with a second thickness,
the first thickness is greater than the second thickness,
the first thickness and the second thickness are measured from an inner surface of the carcass to a tire inner cavity surface,
in a tire meridian cross-section, a cross-sectional area of the inner rubber is in a range from 1.5% to 10% of an inner-cavity cross-sectional area of the pneumatic tire,
the tread portion comprises a plurality of circumferential grooves extending continuously in a tire circumferential direction and a tread rubber forming a ground contact surface,
a maximum value of the first thickness of the first portion is in a range from 0.25 to 0.60 times a maximum value of groove depths of the plurality of circumferential grooves,
a volume of the inner rubber is in a range from 0.30 to 0.50 times a volume of the tread rubber, and
a loss tangent tan δ1 of the first portion at 70 degrees c is equal to or more than 1.1 times and equal to or less than 1.5 times the loss tangent tan δ2 of the second portion at 70 degrees C.

19. A pneumatic tire comprising:
a tread portion;
a pair of sidewall portions;
a pair of bead portions;
a carcass extending between the pair of bead portions; and
an inner rubber extending between the pair of bead portions on an inner side of the carcass; wherein
the inner rubber comprises a first portion extending in the tread portion with a first thickness and a second portion extending in each of or one of the pair of sidewall portions with a second thickness,
the first thickness is greater than the second thickness,
the first thickness and the second thickness are measured from an inner surface of the carcass to a tire inner cavity surface,
in a tire meridian cross-section, a cross-sectional area of the inner rubber is in a range from 1.5% to 10% of an inner-cavity cross-sectional area of the pneumatic tire,
the tread portion comprises a plurality of circumferential grooves extending continuously in a tire circumferential direction,
a maximum value of the first thickness of the first portion is in a range from 0.25 to 0.60 times a maximum value of groove depths of the plurality of circumferential grooves,
the first portion is made of a composite of an air-impermeable rubber material and an air-permeable rubber material,
the air-permeable rubber material has a loss tangent tan δ larger than a loss tangent tan δ of the air-impermeable rubber material, and
a loss tangent tan δ1 of the first portion at 70 degrees C. is equal to or more than 1.1 times and equal to or less than 1.5 times the loss tangent tan δ2 of the second portion at 70 degrees C.

* * * * *